(12) United States Patent
Dinca et al.

(10) Patent No.: US 10,442,875 B2
(45) Date of Patent: Oct. 15, 2019

(54) COMPOSITIONS AND METHODS FOR OLEFIN POLYMERIZATION COMPRISING METAL ORGANIC FRAMEWORKS

(71) Applicant: Massachusetts Institute of Technology, Cambridge, MA (US)

(72) Inventors: Mircea Dinca, Somerville, MA (US); Robert J. Comito, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 34 days.

(21) Appl. No.: 15/760,122

(22) PCT Filed: Sep. 14, 2016

(86) PCT No.: PCT/US2016/051659
§ 371 (c)(1),
(2) Date: Mar. 14, 2018

(87) PCT Pub. No.: WO2017/048795
PCT Pub. Date: Mar. 23, 2017

(65) Prior Publication Data
US 2018/0251581 A1 Sep. 6, 2018

Related U.S. Application Data

(60) Provisional application No. 62/306,021, filed on Mar. 9, 2016, provisional application No. 62/218,003, filed on Sep. 14, 2015.

(51) Int. Cl.
*C08F 4/64* (2006.01)
*C08F 4/642* (2006.01)
(Continued)

(52) U.S. Cl.
CPC ............... *C08F 10/02* (2013.01); *B01J 23/06* (2013.01); *B01J 31/16* (2013.01); *B01J 31/1691* (2013.01);
(Continued)

(58) Field of Classification Search
CPC .. C08F 4/64003; C08F 4/64044; C08F 4/642; C08F 4/69008; C08F 4/69112; C08F 110/02; C08F 10/00
See application file for complete search history.

(56) References Cited

U.S. PATENT DOCUMENTS 5,112,974 A 5/1992 Barton
6,893,564 B2 5/2005 Mueller et al.
(Continued)

FOREIGN PATENT DOCUMENTS

CN 104001476 B 5/2016
WO WO 2014/182648 A1 11/2014
(Continued)

OTHER PUBLICATIONS

International Search Report and Written Opinion for PCT/US2016/051659 dated Dec. 30, 2016.
(Continued)

*Primary Examiner* — Caixia Lu
(74) *Attorney, Agent, or Firm* — Wolf, Greenfield & Sacks, P.C.

(57) ABSTRACT

Compositions and methods for selective olefin (e.g., ethylene) polymerization comprising metal organic frameworks (MOFs) are generally provided. In some embodiments, a MOF comprises a plurality of metal ions, each coordinated with at least one ligand comprising at least two unsaturated N-heterocyclic aromatic groups arranged about an organic core.

21 Claims, 5 Drawing Sheets

(51) Int. Cl.
| | |
|---|---|
| *C08F 4/69* | (2006.01) |
| *C08F 10/00* | (2006.01) |
| *C08F 110/02* | (2006.01) |
| *C08F 10/02* | (2006.01) |
| *B01J 23/06* | (2006.01) |
| *B01J 31/16* | (2006.01) |
| *B01J 35/10* | (2006.01) |
| *C08F 210/16* | (2006.01) |
| *B01J 23/24* | (2006.01) |

(52) U.S. Cl.
CPC ........... *B01J 35/1028* (2013.01); *C08F 4/642* (2013.01); *C08F 4/64003* (2013.01); *C08F 4/64044* (2013.01); *C08F 4/69008* (2013.01); *C08F 4/69112* (2013.01); *C08F 110/02* (2013.01); *C08F 210/16* (2013.01); *B01J 23/24* (2013.01); *B01J 2231/10* (2013.01); *B01J 2531/0216* (2013.01); *B01J 2531/26* (2013.01); *B01J 2531/46* (2013.01); *B01J 2531/62* (2013.01); *C08F 2410/03* (2013.01)

(56) References Cited

U.S. PATENT DOCUMENTS

| | | | |
|---|---|---|---|
| 7,215,473 | B2 | 5/2007 | Fleming |
| 7,662,746 | B2 | 2/2010 | Yaghi et al. |
| 8,197,579 | B2 | 6/2012 | Miller |
| 8,372,779 | B2 | 2/2013 | Schubert et al. |
| 8,764,887 | B2 | 7/2014 | Dinca et al. |
| 9,758,532 | B2 | 9/2017 | Dinca et al. |
| 2001/0003950 | A1 | 6/2001 | Zhang et al. |
| 2007/0171107 | A1 | 7/2007 | Wang |
| 2008/0188677 | A1 | 8/2008 | Schubert et al. |
| 2008/0306315 | A1 | 12/2008 | Lillerud et al. |
| 2009/0221418 | A1 | 9/2009 | Fischer et al. |
| 2010/0197990 | A1 | 8/2010 | Schubert et al. |
| 2010/0322837 | A1 | 12/2010 | Miller |
| 2011/0137100 | A1 | 6/2011 | Toulhoat et al. |
| 2011/0294658 | A1 | 12/2011 | Lefevre et al. |
| 2012/0077667 | A1 | 3/2012 | Liu et al. |
| 2012/0141685 | A1 | 6/2012 | Gaab et al. |
| 2013/0066128 | A1 | 3/2013 | Breuil et al. |
| 2013/0152789 | A1 | 6/2013 | Polshettiwar et al. |
| 2013/0204025 | A1 | 8/2013 | Buso et al. |
| 2014/0012039 | A1 | 1/2014 | Yaghi et al. |
| 2014/0326007 | A1 | 11/2014 | Dinca et al. |
| 2015/0047505 | A1 | 2/2015 | Schroder et al. |
| 2016/0102040 | A1 | 4/2016 | Allen et al. |
| 2017/0073364 | A1 | 3/2017 | Dinca et al. |
| 2017/0341010 | A1 | 11/2017 | Dinca et al. |

FOREIGN PATENT DOCUMENTS

| | | |
|---|---|---|
| WO | WO 2015/142954 A1 | 9/2015 |
| WO | WO 2015/171791 A1 | 11/2015 |
| WO | WO 2017/048787 A1 | 3/2017 |
| WO | WO 2018/067636 A1 | 4/2018 |

OTHER PUBLICATIONS

International Preliminary Report on Patentability for PCT/US2016/051659 dated Mar. 29, 2018.
Abbenhuis, Heterogenization of Metallocene Catalysts for Alkene Polymerization. Angew. Chem. Int. Ed. 1999;38(8):1058-60.
Achmann et al., Metal-Organic Frameworks for Sensing Applications in the Gas Phase. Sensors. 2009;9(3):1574-89. Epub Mar. 6, 2009.
Akiyama et al., Effect of functional groups in MIL-101 on water sorption behavior. Microporous and Mesoporous Materials. 2012;157:89-93.
Alarco-Padilla et al., Application of absorption heat pumps to multi-effect distillation: a case study of solar desalination. Desalination. Jun. 25, 2007;212:294-302.
Al-Sa'Doun, Dimerization of ethylene to butene-1 catalyzed by Ti(OR')4-AlR3. Applied Catalysis A. Nov. 2, 1993;105(1):1-40.
Askalany et al., An overview on adsorption pairs for cooling. Renewable and Sustainable Energy Reviews. Mar. 2013;19:565-72.
Baier et al., Post-Metallocenes in the Industrial Production of Polyolefins. Ange. Chemie Int. Ed. Sep. 8, 2014;53(37):9722-44.
Bellarosa et al. When the Solvent Locks the Cage: Theoretical Insight into the Transmetalation of MOF-5 Lattices and Its Kinetic Limitations. Chem. Mater. 2015;27(9):3422-9. Epub Apr. 13, 2015.
Bertrand et al., Thiophene-based covalent organic frameworks. PNAS. Mar. 26, 2013;110(13):4923-8. Epub Mar. 11, 2013.
Biswas et al., A cubic coordination framework constructed from benzobistriazolate ligands and zinc ions having selective gas sorption properties. Dalton Trans. 2009:6487-95. Epub Jun. 29, 2009.
Biswas et al., Homo- and Heteropentanuclear Coordination Compounds with Td Symmetry—the Solid State Structures of [MZn4(L)4(L')6] (M=CoII or Zn; L=chloride or acac; L'=1,2,3-benzotriazolate). Z. Anorg. Allg. Chem. Oct. 2008;634(14):2532-8.
Biswas et al., Syntheses and Magnetostructural Investigations on Kuratowski-Type Homo- and Heteropentanuclear Coordination Compounds [MZn4Cl4(L)6] (MII=Zn, Fe, Co, Ni, or Cu; L=5,6-Dimethyl-1,2,3-benzotriazolate) Represented by the Nonplanar K3,3 Graph. Inorg. Chem. 2010;49(16):7424-34. Epub Jul. 16, 2010.
Bonaccorsi et al., Hydrothermal and microwave synthesis of SAPO (CHA) zeolites on aluminum foams for heat pumping applications. Microporous and Mesoporous Mater. 2013;167:30-37.
Boudjouk et al., Solvated and Unsolvated Anhydrous Metal Chlorides from Metal Chloride Hydrates. Inorg. Synth. 1992;29:108-11.
Brozek et al., Cation exchange at the secondary building units of metal-organic frameworks. Chem. Soc. Rev. 2014;43:5456-67. Epub May 16, 2014.
Brozek et al., Dynamic DMF Binding in MOF-5 Enables the Formation of Metastable Cobalt-Substituted MOF-5 Analogues. ACS Cent. Sci. 2015;1(5):252-60. Epub Jul. 29, 2015.
Brozek et al., Lattice-imposed geometry in metal-organic frameworks: lacunary Zn4O clusters in MOF-5 serve as tripodal chelating ligands for Ni2+. Chemical Science. 2012;3:2110-3. Epub Apr. 4, 2012.
Brozek et al., No Disproportionation at a Mononuclear Site-Isolated Fe2+ Center in Fe2+-MOF-5. J. Am. Chem. Soc. 2015;137(23):7495-501. Epub May 19, 2015.
Brozek et al., Solvent-Dependent Cation Exchange in Metal-Organic Frameworks. Chem. Eur. J. Jun. 2, 2014;20(23):6871-4.
Brozek et al., Ti3+-, V2+/3+-, Cr2+/3+-, Mn2+-, and Fe2+-Substituted MOF-5 and Redox Reactivity in Cr- and Fe-MOF-5. J. Am. Chem. Soc. 2013;135(34):12886-91. Epub Jul. 31, 2013.
Cadiau et al., Design of Hydrophilic Metal Organic Framework Water Adsorbents for Heat Reallocation. Adv. Mater. 2015;27:4775-80. Epub Aug. 26, 2015.
Campbell et al., Chemiresistive Sensor Arrays from Conductive 2D Metal-Organic Frameworks. J. Am. Chem. Soc. 2015;137(43):13780-3. Epub Oct. 11, 2015.
Campbell et al., Cu3(hexaiminotriphenylene)2: An Electrically Conductive 2D Metal-Organic Framework for Chemiresistive Sensing. Angewandte Chemie Int Ed. Mar. 27, 2015;54(14):4349-52. Epub Feb. 9, 2015. Supporting Information Included.
Canivet et al., MOF-Supported Selective Ethylene Dimerization Single-Site Catalysts through One-Pot Postsynthetic Modification. J. Am. Chem. Soc. 2013;135:4195-8. Epub Mar. 7, 2013.
Canivet et al., Structure-property relationships of water adsorption in metal-organic frameworks. New J. Chem. 2014;38:3102-11. Epub Apr. 16, 2014.
Canivet et al., Water adsorption in MOFs: fundamentals and applications. Chem. Soc. Rev. 2014;43:5594-617. Epub May 29, 2014.
Caskey et al., Dramatic tuning of carbon dioxide uptake via metal substitution in a coordination polymer with cylindrical pores. J Am Chem Soc. Aug. 20, 2008;130(33):10870-1. doi: 10.1021/ja8036096. Epub Jul. 29, 2008.
Chen et al., Noncovalently Netted, Photoconductive Sheets with Extremely High Carrier Mobility and Conduction Anisotropy from

(56) References Cited

OTHER PUBLICATIONS

Triphenylene-Fused Metal Trigon Conjugates. J Am Chem Soc. 2009;131(21):7287-92. Epub May 4, 2009.
Chmiola et al., Anomalous Increase in Carbon Capacitance at Pore Sizes Less Than 1 Nanometer. Science. Sep. 22, 2006;313(5794):1760-3.
Chmiola et al., Desolvation of Ions in Subnanometer Pores and Its Effect on Capacitance and Double Layer Theory. Angew. Chem. Int. Ed. Apr. 21, 2008;47(18):3392-5.
Choi et al., Broadly hysteretic H2 adsorption in the microporous metal-organic framework Co(1,4-benzenedipyrazolate). J Am Chem Soc. Jun. 25, 2008;130(25):7848-50. doi: 10.1021/ja8024092. Epub May 31, 2008.
Choi et al., Hydrogen storage in water-stable metal-organic frameworks incorporating 1,3- and 1,4-benzenedipyrazolate. Energy Environ. Sci. 2010;3:117-23. Epub Nov. 4, 2009.
Choi et al., Supported Single-Site Catalysts for Slurry and Gas-Phase Olefin Polymerisation. Can. J. of Chem. Eng. Jun. 2012;90:646-71.
Church et al., A New Multicomponent Reaction Catalyzed by a [Lewis Acid]+[Co(CO)4]-Catalyst: Stereospecific Synthesis of 1,3-Oxazinane-2,4-diones from Epoxides, Isocyanates, and CO. J. Am. Chem. Soc. 2007;129(26):8156-62. Epub Jun. 12, 2007. Abstract Only.
Church et al., Carbonylation of heterocycles by homogeneous catalysts. Chem. Commun. 2007;7:657-74. Epub Jan. 19, 2007.
Coasne et al., Temperature Effect on Adsorption/Desorption Isotherms for a Simple Fluid Confined within Various Nanopores. Adsorption. Jul. 2005;11:289-94.
Colombo et al., High thermal and chemical stability in pyrazolate-bridged metal-organic frameworks with exposed metal sites. Chem. Sci. 2011;2:1311-9. Epub Apr. 28, 2011.
Comito et al., Single-Site Heterogeneous Catalysts for Olefin Polymerization Enabled by Cation Exchange in a Metal-Organic Framework. J. Am. Chem. Soc. 2016;138(32):10232-7. Epub Jul. 21, 2016. Supporting Information Included.
Corma et al., Engineering Metal Organic Frameworks for Heterogeneous Catalysis. Chem. Rev. 2010;110(8):4606-55. Epub Apr. 1, 2010.
Critoph, Evaluation of alternative refrigerant-adsorbent pairs for refrigeration cycles. Applied Thermal Engineering. Nov. 1996;16(11):891-900.
Cui et al., An electroactive porous network from covalent metal-dithiolene links. Chem Commun. 2014;50:3986-8. Epub Feb. 24, 2014.
Cychosz et al., Water stability of microporous coordination polymers and the adsorption of pharmaceuticals from water. Langmuir. Nov. 16, 2010;26(22):17198-202. doi: 10.1021/la103234u. Epub Oct. 5, 2010.
De Lange et al., Adsorption-Driven Heat Pumps: The Potential of Metal-Organic Frameworks. Chem. Rev. 2015;115(22):12205-50. Epub Oct. 23, 2015.
De Lange et al., Metal-Organic Frameworks in Adsorption-Driven Heat Pumps: The Potential of Alcohols as Working Fluids. Langmuir. 2015;31(46):12783-96. Epub Nov. 2, 2015.
Denysenko et al., Elucidating Gating Effects for Hydrogen Sorption in MFU-4-Type Triazolate-Based Metal-Organic Frameworks Featuring Different Pore Sizes. Chem. Eur. J. 2011;17(6):1837-48. Epub Jan. 12, 2011.
Denysenko et al., Postsynthetic Metal and Ligand Exchange in MFU-41: A Screening Approach toward Functional Metal-Organic Frameworks Comprising Single-Site Active Centers. Chem. Eur. J. May 26, 2015;21(22):8188-99.
Denysenko et al., Reversible gas-phase redox processes catalyzed by Co-exchanged MFU-4l(arge). Chem. Commun. 2012;48:1236-8. Epub Dec. 6, 2011.
Denysenko et al., Scorpionate-Type Coordination in MFU-41 Metal-Organic Frameworks: Small-Molecule Binding and Activation upon the Thermally Activated Formation of Open Metal Sites. Angew. Chemie Int. Ed. Jun. 2, 2014;53(23):5832-6.
Deria et al., Beyond post-synthesis modification: evolution of metal-organic frameworks via building block replacement. Chem. Soc. Rev. 2014;43:5896-912. Epub Apr. 11, 2014.
Desantis et al., Techno-economic Analysis of Metal-Organic Frameworks for Hydrogen and Natural Gas Storage. Energy Fuels. 2017;31(2):2024-32. Epub Jan. 4, 2017.
Dinca et al., DALTON Lecture: New Application of Metal-Organic Frameworks. UC Berkeley. Mar. 11, 2016. 49 pages.
Dinca et al., Designer Porous material for Clean Energy and Water. International Workshop on Advanced Materials. Al Hamra Fort, Ras al Khaimah, UAE. Feb. 2017. 7 pages.
Dinca et al., Teaching Sponges New Tricks: Redox Reactivity and Charge Transport in Microporous Metal-Organic Frameworks. Princeton University. Frick Chemistry Laboratory, Taylor Auditorium. Princeton, NJ. Sep. 14, 2015. 48 pages.
Dinca, Dynamic MOF SBUs as Active Sites for Small Molecule Reactivity and Catalysis. 253rd National ACS Meeting. San Francisco, CA. Apr. 2017. 10 pages.
Dinca, Teaching Sponges New Tricks: Small Molecule Chemistry and Charge Transport in Microporous Metal-Organic Frameworks. NSF Center for Chemical Innovation. Brown University. Providence, RI. May 2014. 4 pages.
Domski et al., Living alkene polymerization: New methods for the precision synthesis of polyolefins. Progress in Polymer Science. Jan. 2007;32(1):30-92.
Doonan et al., Exceptional ammonia uptake by a covalent organic framework. Nature Chemistry. 2010;2:235-8. Epub Feb. 7, 2010.
Ehrenmann et al., Water adsorption characteristics on MIL-101 for heat-transformation application of MOFs. Eur J Inorg Chem. 2011;2011(4):471-474.
Farrusseng et al., Metal-Organic Frameworks: Opportunities for Catalysis. Angew. Chemie Int. Ed. Sep. 28, 2009;48(41):7502-13.
Feigl et al., Über Verbindungen des Nickels mito-Phenylendiamin und 1, 3, 4-Toluylendiamin. Monatsh. Chem. Jul. 1927;48(7):445-50.
Férey et al., A Chromium Terephthalate-Based Solid with Unusually Large Pore Volumes and Surface Area. Science. Sep. 23, 2005;309(5743):2040-2.
Finiels et al., Nickel-based solid catalysts for ethylene oligomerization—a review. Catal. Sci. Technol. 2014;4:2412-26. Epub Apr. 16, 2014.
Froehlich et al., Multicycle water vapour stability of microporous breathing MOF aluminium isophthalate CAU-10-H. Dalton Trans. 2014;43:15300-4. Epub Aug. 26, 2014.
Furlan et al., Highly active zirconium(IV) catalyst containing sterically hindered hydridotris(pyrazolyl)borate ligand for the polymerization of ethylene. Macromolecular Rapid Communications. Oct. 2000;21(15):1054-7.
Furukawa et al., The chemistry and applications of metal-organic frameworks. Science. Aug. 30, 2013;341(6149):1230444. doi: 10.1126/science.1230444. 12 pages.
Furukawa et al., Water adsorption in porous metal-organic frameworks and related materials. J Am Chem Soc. Mar. 19, 2014;136(11):4369-81. doi: 10.1021/ja500330a. Epub Mar. 11, 2014.
Gandara et al., Porous, Conductive Metal-Triazolates and Their Structural Elucidation by the Charge-Flipping Method. Chem Eur J. Aug. 20, 2012;18(34):10595-601. Epub Jun. 22, 2012.
Garcia-Orozco et al., Tris(pyrazolyl)methane-chromium(III) complexes as highly active catalysts for ethylene polymerization. Journal of Molecular Catalysis A: Chemical. Dec. 2006;260(1-2):70-6.
Gargiulo et al., Synthesis and characterization of a microporous copper triazolate as a water vapor adsorbent. Microporous and Mesoporous Mater. 2011;145:74-9.
Garzón-Tovar et al., Optimised room temperature, water-based synthesis of CPO-27-M metal-organic frameworks with high space-time yields. J. Mater. Chem. A. 2015;3:20819-26. Epub Sep. 9, 2015.
Getzler et al., Synthesis of β-Lactones: A Highly Active and Selective Catalyst for Epoxide Carbonylation. J. Am. Chem. Soc. 2002;124(7):1174-5. Epub Jan. 24, 2002.

(56) References Cited

OTHER PUBLICATIONS

Gil et al., Copolymerization of Ethylene with 1-Hexene Using Sterically Hindered Tris(pyrazolyl)borate Titanium (IV) Compounds. Macromolecular Chemistry and Physics. Jan. 2001;202(2):319-24.
Golubovic et al., Sorption properties for different types of molecular sieve and their influence on optimum dehumidification performance of desiccant wheels. Int. J. Heat Mass Transf. Aug. 2006;49(17-18):2802-9.
Guo et al., Adsorption of NH3 onto activated carbon prepared from palm shells impregnated with H2SO4. Journal of Colloid and Interface Science. Jan. 15, 2005;281(2):285-90.
Gutzler et al., µ-Electron Conjugation in Two Dimensions. J Am Chem Soc. 2013;135(44):16585-94. Epub Sep. 19, 2013.
Hao et al., Structurally Designed Synthesis of Mechanically Stable Poly(benzoxazine-co-resol)-Based Porous Carbon Monoliths and Their Application as High-Performance CO2 Capture Sorbents. J Am Chem Soc. 2011;133(29):11378-88. Epub Jun. 21, 2011.
Henninger et al., Characterisation and improvement of sorption materials with molecular modeling for the use of heat transformation applications. Adsorption. 2011;17:833-43.
Henninger et al., MOFs as adsorbents for low temperature heating and cooling applications. J Am Chem Soc. Mar. 4, 2009;131(8):2776-7. doi: 10.1021/ja808444z.
Henninger et al., MOFs for Use in Adsorption Heat Pump Processes. European Journal of Inorganic Chemistry. Jun. 2012; 2012(16):2625-34.
Henninger et al., Novel sorption materials for solar heating and cooling. Energy Procedia. 2012;30:279-88.
Henninger et al., Water adsorption characteristics of novel materials for heat transformation applications. Appl. Therm. Eng. 2010;30:1692-1702.
Herebian et al., Molecular and electronic structures of bis-(o-diiminobenzosemiquinonato)metal(II) complexes (Ni, Pd, Pt), their monocations and -anions, and of dimeric dications containing weak metal-metal bonds. J Am Chem Soc. Jul. 30, 2003;125(30):9116-28.
Hermes et al., Selective Nucleation and Growth of Metal-Organic Open Framework Thin Films on Patterned COOH/CF3-Terminated Self-Assembled Monolayers on Au(111). JACS. 2005;127:13744-5.
Hlatky, Heterogeneous Single-Site Catalysts for Olefin Polymerization. Chem. Rev. 2000;100:1347-76.
Hmadeh et al., New Porous Crystals of Extended Metal-Catecholates. Chemistry of Materials. 2012;24(18):3511-3. Epub Aug. 28, 2012.
House et al., The synthesis and X-ray structure of trans-[CrCl2(nPrNH2)4]BF4•H2O and the thermal and Hg2+-assisted chloride release kinetics from some trans-[CrCl2(N)4]+ complexes. Inorganica Chimica Acta. Sep. 1995;237(1-2):37-46.
Janchen et al., Studies of the water adsorption on Zeolites and modified mesoporous materials for seasonal storage of solar heat. Solar Energy. 2004;76:339-44.
Jasuja et al., Adjusting the Stability of Metal-Organic Frameworks under Humid Conditions by Ligand Functionalization. Langmuir. 2012;28(49):16874-80. Epub Nov. 7, 2012.
Jeon et al., Accelerated Life-time Tests including Different Load Cycling Protocols for High Temperature Polymer Electrolyte Membrane Fuel Cells. Electrochimica Acta. Dec. 1, 2014;148:15-25.
Jeremias et al., MIL-100(Al, Fe) as water adsorbents for heat transformation purposes—a promising application. J Mater Chem. 2012;22:10148-10151.
Jeremias et al., Programming MOFs for water sorption: amino-functionalized MIL-125 and UiO-66 for heat transformation and heat storage applications. Dalton Trans. Dec. 7, 2013;42(45):15967-73. doi: 10.1039/c3dt51471d. Epub Jul. 18, 2013.
Jeremias et al., Water and methanol adsorption on MOFs for cycling heat transformation processes. New J Chem. 2014;38:1846-52.
Kambe et al., Redox Control and High Conductivity of Nickel Bis(dithiolene) Complex µ-Nanosheet: A Potential Organic Two-Dimensional Topological Insulator. J Am Chem Soc. 2014;136(41):14357-60. Epub Sep. 24, 2014.

Kambe et al., µ-Conjugated Nickel Bis(dithiolene) Complex Nanosheet. J Am Chem Soc. 2013;135(7):2462-5. Epub Jan. 29, 2013.
Kaminsky et al., High melting polypropenes by silica-supported zirconocene catalysts. Makromol. Chem. Rapid. Commun. 1993;14:239-43.
Katz et al., High volumetric uptake of ammonia using Cu-MOF-74/Cu-CPO-27 . Dalton Trans. 2016;45:4150-3. Epub Sep. 24, 2015.
Khutia et al., Water sorption cycle measurements on functionalized MIL-101 Cr for heat transformation application. Chem Mater. 2013;25:790-798.
Killian et al., Preparation of Linear α-Olefins Using Cationic Nickel(II) α-Diimine Catalysts. Organometallics. 1997;16(10):2005-7. Epub May 13, 1997.
Klet et al., Single-Site Organozirconium Catalyst Embedded in a Metal-Organic Framework. J. Am. Chem. Soc. 2015;137(50):15680-83. Epub Dec. 14, 2015.
Kobayashi et al., Conductivity, Doping, and Redox Chemistry of a Microporous Dithiolene-Based Metal-Organic Framework. Chem Mater. 2010;22(14):4120-2. Epub Jun. 25, 2010.
Kong et al., Opportunities in chemistry and materials science for topological insulators and their nanostructures. Nature Chemistry. 2011;3:845-9. Epub Oct. 24, 2011.
Kramer et al., Practical β-Lactone Synthesis: Epoxide Carbonylation at 1 atm. Org. Lett. 2006;8(17):3709-12. Epub Jul. 18, 2006.
Kreno et al., Metal-Organic Framework Materials as Chemical Sensors. Chemical Reviews. 2012;112(2):1105-25. Epub Nov. 9, 2011.
Kunrath et al., Highly Selective Nickel Ethylene Oligomerization Catalysts Based on Sterically Hindered Tris(pyrazolyl)borate Ligands. Organometallics. 2003;22:4739-43. Epub Oct. 9, 2003.
Kusgens et al., Characterization of metal-organic frameworks by water adsorption. Microporous and Mesoporous Mater. 2009;120:325-330.
Lallemand et al., Catalytic oligomerization of ethylene over Ni-containing dealuminated Y zeolites. Appl. Catal. A Gen. Feb. 2006;301:196-201.
Lallemand et al., Ethylene oligomerization over Ni-containing mesostructured catalysts with MCM-41, MCM-48 and SBA-15 topologies. Studies in Surface Science and Catalysis. 2007;170:1863-9. Epub Oct. 18, 2007.
Lallemand et al., Ni-MCM-36 and Ni-MCM-22 catalysts for the ethylene oligomerization. Studies in Surface Science and Catalysis. 2008;174:1139-42. Epub Nov. 6, 2008.
Li et al., Design and synthesis of an exceptionally stable and highly porous metal-organic framework. Nature. 1999;402:276-9. Epub Nov. 18, 1999.
Li et al., Highly active self-immobilized FI—Zr catalysts in a PCP framework for ethylene polymerization. Chem. Commun. 2015;51:16703-6. Epub Sep. 21, 2015.
Li et al., Reductive electrosynthesis of Crystalline Metal-Organic frameworks. JACS. 2011;133:12926-9.
Liao et al., Drastic Enhancement of Catalytic Activity via Post-oxidation of a Porous MnII Triazolate Framework. Chem. Eur. J. Sep. 1, 2014;20(36):11303-7.
Liu et al., High-Performance Chemical Sensing Using Schottky-Contacted Chemical Vapor Deposition Grown Monolayer MoS2 Transistors. ACS Nano. 2014;8(5):5304-14. Epub Apr. 21, 2014.
Liu et al., Postsynthetic modification of mixed-linker metal-organic frameworks for ethylene oligomerization. RSC Adv. 2014;4:62343-6. Epub Nov. 13, 2014.
Liu et al., Single-Walled Carbon Nanotube-Metalloporphyrin Chemiresistive Gas Sensor Arrays for Volatile Organic Compounds. Chem. Mater. 2015;27(10):3560-3. Epub May 8, 2015.
Low et al., Virtual high throughput screening confirmed experimentally: porous coordination polymer hydration. J. Am. Chem. Soc. Nov. 4, 2009;131(43):15834-42. doi: 10.1021/ja9061344.
Luna et al., Evaluation of Commercial Off-the-Shelf Sorbents and Catalysts for Control of Ammonia and Carbon Monoxide. American Institute of Aeronautics and Astronautics. 2008. 15 pages.
Ma et al., A series of isoreticular chiral metal-organic frameworks as a tunable platform for asymmetric catalysis. Nat. Chem. 2010;2:838-46. Epub Jul. 25, 2010.

(56) References Cited

OTHER PUBLICATIONS

Mahadevan et al., [Lewis Acid]+[Co(CO)4]—Complexes: A Versatile Class of Catalysts for Carbonylative Ring Expansion of Epoxides and Aziridines. Angew. Chem. Int. Ed. 2002;41(15):2781-4.
Makal et al., Methane storage in advanced porous materials. Chem Soc Rev. Dec. 7, 2012;41(23):7761-79. doi: 10.1039/c2cs35251f.
Maki et al., Electron Paramagnetic Resonance Studies of the Electronic Structures of Bis(maleonitriledithiolato)copper(II), -nickel(III), -cobalt(II), and -rhodium(II) Complexes. J. Am Chem. Soc. Nov. 1964;86(21):4580-7.
Marshall et al., Single-Crystal to Single-Crystal Mechanical Contraction of Metal-Organic Frameworks through Stereoselective Postsynthetic Bromination. J. Am. Chem. Soc. 2015;137:9527-30. Epub Jul. 15, 2015.
Merica et al., Synthesis of nitropolychlorinated dibenzo-p-dioxins (NPCDDs) and their photochemical reaction with nucleophiles. Can. J. Chem. 1995;73:826-35.
Metzger et al., Selective Dimerization of Ethylene to 1-Butene with a Porous Catalyst. ACS Cent. Sci. 2016;2(3):148-53. Epub Feb. 19, 2016. Supporting Information Included.
Miner et al., Electrochemical oxygen reduction catalysed by Ni3(hexaiminotriphenylene)2. Nat Commun. Mar. 2016;7:10942. 7 pages.
Mlinar et al., Selective Propene Oligomerization with Nickel(II)-Based Metal-Organic Frameworks. ACS Catal. 2014;4(3):717-21. Epub Jan. 27, 2014.
Mondloch et al., Destruction of chemical warfare agents using metal-organic frameworks. Nat. Mater. 2015;14:512-6. Epub Mar. 16, 2015.
Murtuza et al., Ethylene Polymerization Behavior of Tris(pyrazolyl)borate Titanium(IV) Complexes. Organometallics. 2002;21(9):1882-90. Epub Mar. 28, 2002.
Narayan et al., High Charge Mobility in a Tetrathiafulvalene-Based Microporous Metal-Organic Framework. J Am Chem Soc. 2012;134(31):12932-5. Epub Jul. 24, 2012.
Narayanan et al., Optimization of adsorption processes for climate control and thermal energy storage. Int. J. Heat Mass Transf. Oct. 2014;77:288-300.
Ng et al., Experimental investigation of the silica gel-water adsorption isotherm characteristics. Appl. Therm Eng. 2001;21:1631-42.
Nguyen et al., High Methanol Uptake Capacity in Two New Series of Metal-Organic Frameworks: Promising Materials for Adsorption-Driven Heat Pump Applications. Chem. Mater. 2016;28(17):6243-9. Epub Aug. 8, 2016.
Noro et al., Metal-organic thin-film transistor (MOTFT) based on a bis(o-diiminobenzosemiquinonate) nickel(II) complex. J Am Chem Soc. Jul. 20, 2005;127(28):10012-3.
Park et al., Cation-Dependent Intrinsic Electrical Conductivity in Isostructural Tetrathiafulvalene-Based Microporous Metal-Organic Frameworks. J. Am. Chem. Soc. 2015;137(5):1774-7. Epub Jan. 18, 2015.
Park et al., Heterogeneous Epoxide Carbonylation by Cooperative Ion-Pair Catalysis in Co(CO)4—Incorporated Cr-MIL-101. ACS Cent. Sci. 2017;3(5):444-8. Epbu Mar. 21, 2017. Supporting Information Included.
Park et al., Single-Ion Li+, Na+, and Mg2+ Solid Electrolytes Supported by a Mesoporous Anionic Cu-Azolate Metal-Organic Framework. J. Am. Chem. Soc. 2017;139(38):13260-3. Epbu Sep. 7, 2017.
Petit et al., The role of sulfur-containing groups in ammonia retention on activated carbons. Carbon. Mar. 2010;48(3):654-67.
Petit et al., Toward Understanding Reactive Adsorption of Ammonia on Cu-MOF/Graphite Oxide Nanocomposites. Langmuir. 2011;27(21):13043-51. Epub Oct. 4, 2011.
Pommier et al., Recent Advances in β-Lactone Chemistry. Synthesis. 1993;5:441-59.
Qajar et al., Enhanced ammonia adsorption on functionalized nanoporous carbons. Microporous and Mesoporous Materials. Dec. 1, 2015;218:15-23.
Rieth et al., High and Reversible Ammonia Uptake in Mesoporous Azolate Metal-Organic Frameworks with Open Mn, Co, and Ni Sites. J. Am. Chem. Soc. 2016;138(30):9401-4. Epub Jul. 15, 2016. Supporting Information Included.
Rieth et al., Record Atmospheric Fresh Water Capture and Heat Transfer with a Material Operating at the Water Uptake Reversibility Limit. ACS Cent. Sci. 2017;3(6):668-72. Epub May 24, 2017. Supporting Information Included.
Ristic et al., The performance of small-pore microporous aluminophosphates in low-temperature solar energy storage: the structure-property relationship. Adv Func Mater. 2012;22:1952-7.
Saha et al., Fundamental and application aspects of adsorption cooling and desalination. Appl. Therm. Eng. Mar. 25, 2016;97:68-76.
Schmidt et al., A Readily Synthesized and Highly Active Epoxide Carbonylation Catalyst Based on a Chromium Porphyrin Framework: Expanding the Range of Available β-Lactones. Org. Lett. 2004;6(3):373-6. Epub Jan. 8, 2004.
Schmidt et al., Chromium(III) Octaethylporphyrinato Tetracarbonylcobaltate: A Highly Active, Selective, and Versatile Catalyst for Epoxide Carbonylation. J. Am. Chem. Soc. 2005;127(32):11426-35. Epub Jul. 16, 2015.
Schoenecker et al., Effect of water adsorption on retention of structure and surface area of metal-organic frameworks. Ind Eng Chem Res. 2012;51:6513-6519.
Severn et al., "Bound but Not Gagged" Immobilizing Single-Site α-Olefin Polymerization Catalysts. Chem. Rev. 2005;105:4073-147. Epub Oct. 22, 2005.
Shamir, New synthesis of chromium trichloride tetrahydrofuranate. Inorganica Chimica Acta. Feb. 15, 1989;156(2):163-4.
Sheberla et al., Conductive MOF electrodes for stable supercapacitors with high areal capacitance. Nature Materials. 2017;16:220-4. Epub Oct. 10, 2016. Supporting Information Included.
Sheberla et al., High Electrical Conductivity in Ni3(2,3,6,7,10,11-hexaiminotriphenylene)2, a Semiconducting Metal-Organic Graphene Analogue. J Am Chem Soc. 2014;136(25):8859-62. Epub Apr. 21, 2014. Supporting Information Included.
Shustova et al., Selective Turn-On Ammonia Sensing Enabled by High-Temperature Fluorescence in Metal-Organic Frameworks with Open Metal Sites. J Am Chem Soc. 2013;135(36):13326-9. Epub Aug. 27, 2013.
Speiser et al., Catalytic Ethylene Dimerization and Oligomerization: Recent Developments with Nickel Complexes Containing P,N-Chelating Ligands. Acc. Chem. Res. 2005;38(10):784-93. Epub Sep. 9, 2005.
Stavila et al., MOF-based electronic and opto-electronic devices. Chem Soc Rev. Aug. 21, 2014;43(16):5994-6010. doi: 10.1039/c4cs00096j.
Stiefel et al., The Myth of Nickel(III) and Nickel(IV) in Planar Complexes. J. Am. Chem. Soc. Jul. 1965;87(13):3016-7.
Stoeckli et al., Specific and non-specific interactions between ammonia and activated carbons. Carbon. 2004;42(8-9):1619-24.
Suh et al., Hydrogen storage in metal-organic frameworks. Chem Rev. 2012;112:782-835.
Sumida et al., Carbon dioxide capture in metal-organic frameworks. Chem Rev. Feb. 8, 2012;112(2):724-81. doi: 10.1021/cr2003272. Epub Dec. 28, 2011.
Sun et al., Electrically Conductive Porous Metal-Organic Frameworks. Agnew Chem Int Ed Engl. Mar. 7, 2016;55(11):3566-79. doi: 10.1002/anie.201506219. Epub Jan. 8, 2016. Review.
Sun et al., Measuring and Reporting Electrical Conductivity in Metal-Organic Frameworks: Cd2(TTFTB) as a Case Study. J Am Chem Soc. 2016;138(44):14772-82. Epub Oct. 21, 2016.
Sun et al., Mn2(2,5-disulfhydrylbenzene-1,4-dicarboxylate): A Microporous Metal-Organic Framework with Infinite (-Mn-S-)∞ Chains and High Intrinsic Charge Mobility. J Am Chem Soc. 2013;135(22):8185-8. Epub May 14, 2013.
Svejda et al., Ethylene Oligomerization and Propylene Dimerization Using Cationic (α-Diimine)nickel(II) Catalysts. Organometallics. 1999;18(1):65-74. Epub Dec. 15, 1998.
Talin et al., Tunable electrical conductivity in metal-organic framework thin-film devices. Science. Jan. 3, 2014;343(6166):66-9. doi: 10.1126/science.1246738. Epub Dec. 5, 2013.

(56) References Cited

OTHER PUBLICATIONS

Tamainot-Telto et al., Carbon-ammonia pairs for adsorption refrigeration applications: ice making, air conditioning and heat pumping. International Journal of Refrigeration. Sep. 2009;32(6):1212-29.
Tatsidjodoung et al., A review of potential materials for thermal energy storage in building applications. Renew. Sust. Energ. Rev. 2013;18:327-49.
Teufel et al., MFU-4—A Metal-Organic Framework for Highly Effective H2/D2 Separation. Adv. Mater. Jan. 2013;25(4):635-9.
Theopold, Homogeneous Chromium Catalysts for Olefin Polymerization. Eur. J. Inorg. Chem. Jan. 1998;1:15-24.
Tonigold et al., Pyrazolate-based cobalt(II)-containing metal-organic frameworks in heterogeneous catalytic oxidation reactions: elucidating the role of entatic states for biomimetic oxidation processes. Chemistry. Jul. 25, 2011;17(31):8671-95. doi: 10.1002/chem.201003173. Epub Jun. 17, 2011.
Tulchinsky et al., Reversible Capture and Release of Cl2 and Br2 with a Redox-Active Metal-Organic Framework. J. Am. Chem. Soc. 2017;139(16):5992-7. Epub Mar. 28, 2017.
Van Humbeck et al., Ammonia Capture in Porous Organic Polymers Densely Functionalized with Brønsted Acid Groups. J. Am. Chem. Soc. 2014;136(6):2432-40. Epub Jan. 23, 2014.
Wade et al., Facile Deposition of Multicolored Electrochromic Metal-Organic Framework Thin Films. Angew Chem. Int. Ed. 2013;52(50):13377-81. Epub Oct. 16, 2013.
Wade et al., Investigation of the synthesis, activation, and isosteric heats of CO2 adsorption of the isostructural series of metal-organic frameworks M3(BTC)2 (M=Cr, Fe, Ni, Cu, Mo, Ru). Dalton Trans. Jul. 14, 2012;41(26):7931-8. doi: 10.1039/c2dt30372h. Epub Apr. 26, 2012.
Wade et al., Postsynthetic tuning of hydrophilicity in pyrazolate MOFs to modulate water adsorption properties. Energy Environ. Sci. 2013;6:2172-7.
Wade, Designing functionality for anion detection with molecular receptors and small molecule adsorption in microporous materials. PowerPoint Presentation. Brandeis University. Dec. 4, 2012. 50 pages.
Wang et al., A review on adsorption working pairs for refrigeration. Renewable and Sustainable Energy Reviews. Apr. 2009;13(3):518-34.
Wang et al., Organic topological insulators in organometallic lattices. Nat Commun. 2013;4:1471. Epub Feb. 12, 2013. 5 pages.
Wang et al., Prediction of a Two-Dimensional Organic Topological Insulator. Nano Lett. 2013;13(6):2842-5. Epub May 16, 2013.
Wang et al., Pyrazolate-Based Porphyrinic Metal-Organic Framework with Extraordinary Base-Resistance. J. Am. Chem. Soc. 2016;138(3):914-9. Epub Dec. 30, 2015.
Wickenheisser et al., Grafting of hydrophilic ethylene glycols or ethylenediamine on coordinatively unsaturated metal sites in MIL-100(Cr) for improved water adsorption characteristics. Inorganica Chimica Acta. 2013;407:145-52.
Wu et al., A Homochiral Porous Metal-Organic Framework for Highly Enantioselective Heterogeneous Asymmetric Catalysis. J. Am. Chem. Soc. 2005;127(25):8940-1. Epub Jun. 4, 2005.
Wu et al., Adsorption sites and binding nature of CO2 in prototypical metal-organic frameworks: a combined neutron diffraction and first-principles study. J Phys Chem Lett. 2010;1(13):1946-51.
Xiao et al., Oxidation of ethane to ethanol by N2O in a metal-organic framework with coordinatively unsaturated iron(II) sites. Nat Chem. Jul. 2014;6(7):590-5. doi: 10.1038/nchem.1956. Epub May 18, 2014.
Yamada et al., First-Principles Design of Half-Filled Flat Band of the Kagome Lattice in Two-Dimensinoal Metal-Organic Frameworks. Jul. 26, 2016. arXiv:1510.00164v3.
Yamazoe et al., Receptor Function and Response of Semiconductor Gas Sensor. Journal of Sensors. 2009;2009:21 pages.
Yang et al., Temperature-Triggered Collection and Release of Water from Fogs by a Sponge-Like Cotton Fabric. Adv. Mater. Feb. 25, 2013;25(8):1150-4.
Zhang et al., Ethylene Oligomerization Over Heterogeneous Catalysts. Energy and Environment Focus. Sep. 2014;3(3):246-56.
U.S. Appl. No. 15/309,023, filed Nov. 4, 2016, Dinca et al.
U.S. Appl. No. 15/760,104, filed Mar. 14, 2018, Dinca et al.
U.S. Appl. No. 15/607,255, filed May 26, 2017, Dinca et al.
PCT/US2016/051659, Dec. 30, 2016, International Search Report and Written Opinion.
PCT/US2016/051659, Mar. 29, 2018, International Preliminary Report on Patentability.

COMPOSITIONS AND METHODS FOR OLEFIN POLYMERIZATION COMPRISING METAL ORGANIC FRAMEWORKS

RELATED APPLICATIONS

This application is a national stage application under 35 U.S.C. § 371 of International Patent Application Serial No. PCT/US2016/051659, filed on Sep. 14, 2016, entitled "Compositions and Methods for Olefin Polymerization Comprising Metal Organic Frameworks", which claims priority to U.S. Provisional Patent Application Ser. No. 62/218,003, filed Sep. 14, 2015, and entitled "Compositions and Methods for Selective Olefin Oligomerization Comprising Metal Organic Frameworks", and U.S. Provisional Patent Application Ser. No. 62/306,021, filed Mar. 9, 2016, and entitled "Compositions and Methods for Olefin Polymerization Comprising Metal Organic Frameworks", each of which are incorporated herein by reference in their entirety for all purposes.

FIELD

Compositions and methods for olefin polymerization comprising metal organic frameworks (MOFs) are generally provided. In some embodiments, a MOF comprises a plurality of metal ions, each metal ion coordinated with at least one ligand comprising at least two N-heterocyclic aromatic groups arranged about an organic core.

BACKFROUND

The advent and development of single site catalysts for olefin polymerization has dramatically transformed the polyolefins sector from a commodity market to a highly dynamic and specialized industry. This "metallocene revolution" depended heavily on structurally tunable molecular catalysts that offer fine control over the polymer's molecular structure. However, homogeneous catalysis remains impractical for the production of commercial polyolefins (e.g., polyethylene, polypropylene), whose insolubility contributes to line fouling and reactor walling under conventional solution phase reactor conditions. Industrial slurry and gas phase polymerization of olefins (e.g., ethylene, propylene) rely on granular solid catalysts that lead to solid polymers with a free-flowing powder or bead morphology.

Toward that end, the commercialization of advanced olefin polymers has focused on the development of single-site heterogeneous catalysis. However, conventional inorganic solid catalysts lack the fine electronic and steric control over reactive transition metals that provides selectivity. Moreover, variations in the coordination environment lead to inconsistent reactivities and selectivities among active sites in a given sample.

Accordingly, improved catalysts and methods for the formation of polyolefins are needed.

SUMMARY

In some embodiments, a method for forming a polyolefin from an olefin is provided. In some embodiments, the method comprises exposing the olefin to a metal organic framework (MOF) catalyst to produce the polyolefin, wherein the MOF catalyst comprises a plurality of metal ions, each metal ion coordinated with at least one ligand, and wherein the at least one ligand comprises at least two N-heterocyclic aromatic groups arranged about an organic core.

In some embodiments, an MOF is provided. In some embodiments, the MOF comprises a plurality of metal ions, each coordinated with at least one ligand, wherein the plurality of metal ions comprises at least two types of metal selected from the group consisting of $Zn^{2+}$, $Cr^{2+}$, and $Cr^{3+}$, tetravalent metals, trivalent metals, and $Zn^{+4}$, and wherein the at least one ligand comprises the structure:

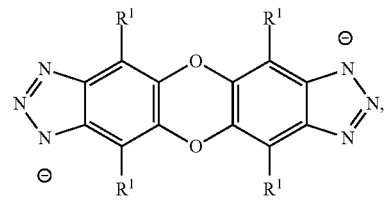

wherein each $R^1$ is the same or different and is selected from the group consisting of hydrogen, -alkyl, —$NO_2$, —R', —F, —Cl, —Br, —I, —CN, —NC, —$SO_3R'$, —$SO_3H$, —OR', —OH, —SR', —SH, —$PO_3R'$, —$PO_3H$, —$CF_3$, —$NR'_2$, —NHR', and —$NH_2$, and each R' is the same or different and is optionally substituted alkyl or optionally substituted aryl.

Figure 1:
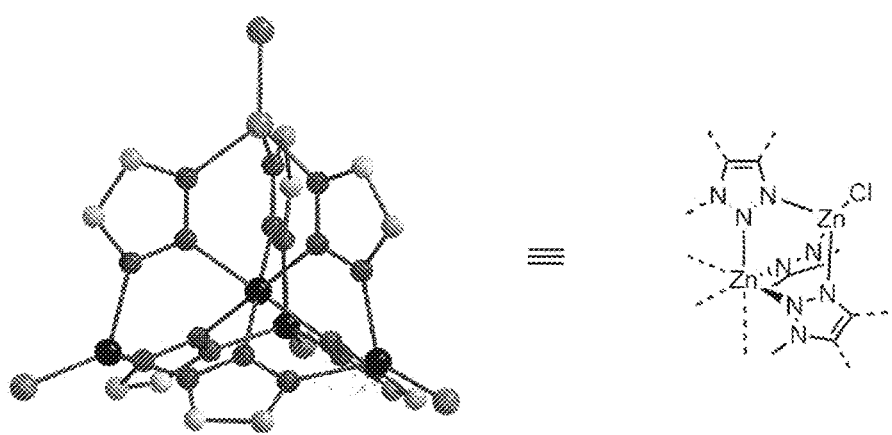
FIG. 1 shows a non-limiting example of the transition metal coordination in a non-limiting MOF, according to a non-limiting embodiment.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Compositions and methods comprising metal organic frameworks (MOFs) and related uses are generally provided. In some embodiments, a MOF comprises a plurality of metal ions, each coordinated with at least one ligand, wherein each ligand comprises at least two unsaturated N-heterocyclic aromatic groups.

The term "metal-organic framework" is given its ordinary meaning in the art and refers to a one-, two-, or three-dimensional coordination polymer including metal ions and ligands which function as organic structural units, wherein a portion of the metal ions are each chemically bonded to at least one ligand comprising a bi-, tri- or poly-dentate organic structural unit. The metal ions, in addition to being coordinated with at least one ligand, may also be bound to one or more auxiliary ligands, as described in more detail herein.

The MOFs described herein may be utilized in a wide variety of applications. In some embodiments, the MOFs may be utilized as a catalyst. For example, in some embodiments, the MOFs may be utilized as a catalyst for olefin oligomerization or olefin polymerization. In a particular embodiment, the MOF may be utilized as a catalyst for ethylene polymerization (e.g., to form polyethylene). In some embodiments, the catalyst is a heterogeneous catalyst. The term "heterogeneous catalyst" will be understood by those of ordinary skill in the art and generally refers to a catalyst in solid state catalyzing a reaction which is fully or partly run in another phase, such as a solvent phase or gaseous phase. In some embodiments, the MOFs described herein are utilized in a solid state, for example, as a solid dispersed in a solution. One non-limiting advantage to heterogeneous catalysts is the catalyst may generally be easily separated from a reaction mixture. In some embodiments, the catalyst (e.g., the heterogeneous catalyst) is a single site catalyst. The term "single site catalyst" will be understood by those of ordinary skill in the art and generally refers to a catalyst that has only single type of kinetically active site. For example, for the MOFs described herein, a single type of metal ion for each MOF may act as the catalytic site(s).

The MOFs described herein are particularly advantageous for use as catalysts for the polymerization of olefins such as ethylene and/or propylene. The MOF catalysts described herein may generally be used in any reactor suitable for the polymerization or oligomerization of olefins. While much of the description herein relates to the homopolymerization of ethylene, those skilled in the art would understand, based upon the teachings of this specification, that other olefins such as propylene, 1-butene, or 1-pentene may also be polymerized or copolymerized (e.g., with ethylene) by catalysis with such MOFs.

Those of ordinary skill in the art will be aware of suitable systems and methods for utilizing a MOF described herein for catalysis. For example, the MOF may be loaded into a reactor for use as an olefin polymerization catalyst. Olefins (e.g., ethylene, propylene, or the like) may be introduced into the reactor, wherein the olefin polymerizes upon exposure to the catalyst. Optionally, the reactor may contain one or more solvents (e.g., an organic solvent) and/or one or more additives (e.g., an alkylaluminum compound, hydrogen). The reactor may be operated at any suitable temperature and/or pressure as described herein. In some embodiments, the reactor may be operated until a high fraction (e.g., greater than about 80%, greater than about 90%, greater than about 95%, or more) of the desired polymer (e.g., polyethylene) is produced.

In some embodiments, the reactor is operated at or near atmospheric pressure. In other embodiments, the reactor is operated at elevated pressures (e.g., under an atmosphere of olefin). In some embodiments, the pressure of olefin in the reactor is between 1 bar and 50 bar, and between 1 bar and 40 bar, and between 5 bar and 40 bar, or between 10 bar and 40 bar, or between 10 bar and 30 bar.

The polymerization may be conducted at any suitable temperature or pressure. For example, in some cases, polymerization in the presence of the MOF may be conducted at about room temperature, for example, about 20° C., or between about 20° C. and about 25° C. In other embodiments, the polymerization may be carried out at temperatures below or above room temperature.

The polymerization may or might not be conducted in the presence of hydrogen. In some embodiments, the polymerization is carried out in the presence of hydrogen. The presence of hydrogen may aid in controlling the molecular weight of the resulting polymer formed. For example, the hydrogen reduce the average molecular weight of the polymer, for example, by acting as a chain transfer agent. The pressure of hydrogen, when present, may be between 0.5 bar and 20 bar, or between 1 bar and 20 bar, or between 1 bar and 10 bar.

In some embodiments, polymerization of an olefin is conducted (e.g., the formation of polyethylene from ethylene) in the presence of the MOF and an additive. In some embodiments, the additive is an alkylaluminum compound. Non-limiting examples of alkylaluminum compounds include aluminoxanes (e.g., methylaluminoxane, modified methylaluminoxane) ethylaluminum dichloride, diethylaluminum chloride, triethylaluminum, and trimethylaluminum. In an exemplary embodiments, the additive is methylaluminoxane. In some embodiments, the additive is an alkyl magnesium halide (e.g., ethyl magnesium bromide). In some embodiments, the additive is an alkyllithium compound (e.g., methyllithium). The additive may be provided in any suitable amount. In some embodiments, the ratio of moles of additive to moles of active metal center (e.g., $Ni^{+2}$) is between 1 and 1000, between 100 and 1000, or between 200 and 800, or between 250 and 750, or between 100 and 500, or about 100, about 200, about 300, about 400, about 500, about 750, or about 1000.

In some embodiments, the MOFs described herein may catalyze the formation of polyethylene from ethylene. In some embodiments, the polyethylene formed in linear high density polyethylene. In some embodiments, the MOFs described herein may catalyze the formation of polypropylene from propylene. In some embodiments, the MOFs described herein may catalyze the formation of poly(ethylene-co-propylene) from ethylene and propylene and/or poly (ethylene-co-1-hexene) from ethylene and 1-hexene.

The molecular weight of the resulting polymer may range from low values to high molecular weights. For example, the molecular weight of the polymer is at least about $1 \times 10^5$, at least about $2 \times 10^5$, at least about $3 \times 10^5$, at least about $4 \times 10^5$, at least about $5 \times 10^5$, at least about $1 \times 10^6$, at least about $2 \times 10^6$, at least about $3 \times 10^6$, at least about $4 \times 10^6$, or at least about $5 \times 10^6$. Those of ordinary skill in the art will be aware of methods for determining the molecular weight of a polymer, for example, by GPC. In some embodiments, the molecular weight is the weight-average molecular weight (i.e., $M_w$). In some embodiments, the molecular weight distributions were calculated based on commercial polystyrene standards.

In some embodiments, the polyethylene formed may be characterized with respect to its percent polymer crystallinity and/or melting point. Those of ordinary skill in the art will be aware of methods for determining the percent polymer crystallinity and/or melting point, for example, using differential scanning calorimetry (DSC). In some embodiments, a theoretical heat of fusion of 293 J/g for crystalline polyethylene is utilized in the characterization. In some embodiments, the percent polymer crystallinity is evaluated by differential scanning calorimetry, using a scan rate of 10° C./minute from 0° C. to 200° C., followed by cooling at the same rate (e.g., using data above from the second heating cycle). See, for example, the method described in TA 123 "Determination of Polymer Crystallinity by DSC" TA Instruments, New Castle, Del., herein incorporated by reference. For example, the polymer sample temperature may be 1) equilibrated to 0° C., 2) heated at 10° C. per minute to 200° C., 3) isothermal at 200° C. for two minutes, 4) cooled at 10° C. per minute to 0° C., 5) heated at 10° C. per minute to 200° C., 6-7) repeat steps 3 and 4. The second scan heat of fusion may be derived by integrating the peak observed in step 5, which can then be divided by the theoretical heat of fusion for the 100% crystalline polyethylene (e.g., 293 J/g as stated above) to give a second scan % crystallinity for the sample.

In some embodiments, the polymer crystallinity for polyethylene formed in the presence on an MOF described herein is between about 30% and about 80%, or between 40% and about 70%, or between about 45% and about 70%, or between about 50% and about 70%, or between about 50% and about 65% (e.g., as determined by the method described above). In some embodiments, the melting point of the polyethylene formed in the presence on an MOF described herein is between about 110° C. and about 140° C., or between about 115° C. and about 140° C., about 120° C. and about 140° C., about 125° C. and about 140° C., about 125° C. and about 135° C., In some embodiments, a MOF comprises a plurality of metal ions, each coordinated with at least one ligand comprising at least two unsaturated N-heterocyclic aromatic groups. In some embodiments, at least some of the metal ions are associated with two, three, or four ligands, and each of those ligands are individually associated with one, two, three, or four metal ions. In some embodiments, at least some of the metal ions are associated with two ligands, and each of those ligand is individually associated with two metal ions. In some embodiments, at least some of the metal ions are associated with three ligands, and each of those ligand is individually associated with three metal ions. In some embodiments, at least some of the metal ions are associated with four ligands, and each of those ligand is individually associated with two metal ions. In some embodiments, a ligand is charged. In some embodiments, a ligand has a charge of (−1), or (−2), or (−3), or (−4). In some embodiments, a ligand has a charge of (−2).

In some cases, each metal ion is coordinated with at least two ligands, at least three ligands, or at least four ligands. For example, in some embodiments, the MOF comprises a plurality of metal ions associated with at least two triazolates, at least three triazolates, or at least four triazolates. Other non-limiting examples of suitable ligands are described in detail herein.

The MOF may comprise any suitable metal ions. In some embodiments, the MOF comprises a first type of metal ion and a second type of metal ion. Each metal ion may be monovalent, divalent, trivalent, or tetravalent. In some embodiments, a least one type of metal ion is a monovalent metal ion. Non-limiting examples of monovalent metal ions are $Ag^+$, $Cu^+$, and $Au^+$. In some embodiments, at least one type of metal ion is a divalent metal ion. Non-limiting examples of monovalent metal ions are $Mg^{2+}$, $Mn^{2+}$, $Fe^{2+}$, $CO^{2+}$, $Ni^{2+}$, $Cu^{2+}$, $Pd^{2+}$, $Pt^{2+}$, $Ru^{2+}$, $Cd^{2+}$, $Zn^{2+}$, $Pb^{2+}$, $Hg^{2+}$, $V^{2+}$, and $Cr^{2+}$. In some cases, the MOF does not comprise $Ni^{+2}$. In some embodiments, at least one type of metal ion is a trivalent metal ion. Non-limiting examples of trivalent metal ions are $Fe^{3+}$, $V^{3+}$, $Ti^{3+}$, $Sc^{3+}$, $Al^{3+}$, $In^{3+}$, $Ga^{3+}$, $Mn^{3+}$, $Co^{3+}$, and $Cr^{3+}$. In some embodiments, at least one type of metal ion is a tetravalent metal ion. A non-limiting example of tetravalent metal ion is $Ti^{4+}$ and $Zn^{4+}$.

In some embodiments, the MOF comprises a plurality of a first type of metal ion and a plurality of a second type of metal ion. In some cases, the first type of metal is selected from the group consisting of $Sc^{3+}$, $Ti^{3+}$, $Ti^{4+}$, $V^{2+}$, $Cr^{2+}$, $Cr^{3+}$, $Mn^{2+}$, $Fe^{2+}$, $Co^{2+}$, $Cu^{2+}$. In some embodiments, the first type of metal ion is selected from the group consisting of $Sc^{3+}$, $Ti^{3+}$, $Ti^{4+}$, $V^{2+}$, $Cr^{2+}$, and $Cr^{3+}$. In some embodiments, the first type of metal ion is $Cr^{2+}$ or $Cr^{3+}$. In some embodiments, the first type of metal ion is not $Ni^{+2}$. In some embodiments, the second type of metal ion is $Zn^{2+}$. In some embodiments, the first type and the second type of metal ions are selected from the group consisting of $Zn^{2+}$, $Cr^{2+}$, and $Cr^{3+}$, tetravalent metals, trivalent metals, and $Zn^{+4}$. In some embodiments, the first type and the second type of metal ions are selected from the group consisting of $Zn^{2+}$, $Cr^{2+}$, and $Cr^{3+}$. In some embodiments, each MOF comprises a single metal ion of the first type. In some embodiments, each MOF comprises more than one of the first type of metal ion. In some embodiments, one or more of the first type of metal ion are the active metal centers for catalysis. In some embodiments, only a single first type of metal ion is an active metal center for catalysis.

In some embodiments, each metal ion in the MOF may be associated with one or more one auxiliary ligands. In some cases, the one or more auxiliary ligand may be found above and/or below the metal ion (e.g., as apical ligands). An auxiliary ligand may or might not be charged. Non-limiting examples of auxiliary ligands include halides (e.g., chlorine, fluorine, bromine, iodine), other salts (e.g., alkyl (e.g., —$CH_3$), allyl, nitrite, sulfite, chloride, fluoride, bromide, iodide, triflate, $BF_4$, $PF_6$, $NO_3^-$, $SO_4^{2-}$, $ClO_4^-$, nitrate, carbonate, sulfonate, etc.), and coordinating solvents (e.g., water, pyridine, tetrahydrofuran, diethyl ether, tetrahydrofuran, ammonia, toluene, benzene, etc.).

In an exemplary embodiment, the MOF comprises a first type of metal and a plurality of second type of metal ions. In some cases, the first type of metal is selected from the group consisting of $Sc^{3+}$, $Ti^{3+}$, $Ti^{4+}$, $V^{2+}$, $Cr^{2+}$, $Cr^{3+}$, $Mn^{2+}$, $Fe^{2+}$, $Co^{2+}$, and $Cu^{2+}$, or as described herein. In some embodiments, the first type of metal ion is not $Ni^{+2}$. In some embodiments, the second type of metal ion is $Zn^{2+}$. In some embodiments, the first type of metal ion associated with three unsaturated N-heterocyclic aromatic groups. For example, the MOF may comprise the structure as in Formula (I):

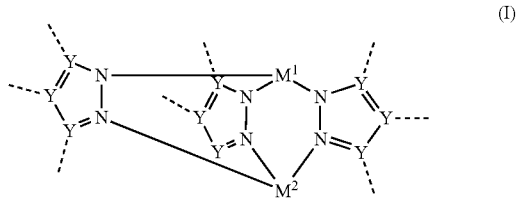

wherein each heteroaromatic ring is a portion of a ligand (as indicated by the dashed lines), $M^1$ is the first type of metal ion, and $M^2$ is the second type of metal ion. Each metal ion may be optionally bound to one or more additional ligands. In this structure, each of $M^1$ and $M^2$ are coordinated with three unsaturated N-heterocyclic aromatic groups. In some embodiments, $M^1$ is $Sc^{3+}$, $Ti^{3+}$, $Ti^{4+}$, $V^{2+}$, $Cr^{2+}$, $Cr^{3+}$, $Mn^{2+}$, $Fe^{2+}$, $Co^{2+}$, or $Cu^{2+}$, or as described herein. In some embodiments $M^2$ is $Zn^{2+}$.

As noted, each metal ion may be optionally bound by one or more other ligands. For example, in some embodiments, the MOF comprises the structure as in Formula (II):

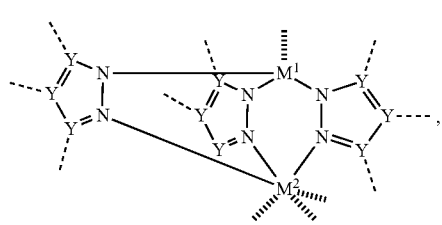

(II)

wherein each ⅠⅠⅠⅠⅠⅠⅠ represents an optional bond to a ligand. In some cases, each ⅠⅠⅠⅠⅠⅠⅠ represents an bond to a ligand. In some embodiments, $M^1$ is bound to an auxiliary ligand as described herein. In some embodiments, $M^1$ is bound to an anionic ligand (e.g., alkyl (e.g., —$CH_3$), allyl, nitrite, sulfite, chloride, fluoride, bromide, iodide, triflate, $BF_4$, $PF_6$, $NO_3^-$, $SO_4^{2-}$, and $ClO_4$). In some embodiments, $M^2$ is bound to additional ligands comprising N-heterocyclic aromatic groups. In some embodiments, $M^2$ is bound by six ligands comprising N-heterocyclic aromatic groups. In some embodiments, the ligand comprising the N-heterocyclic aromatic group has a structure as in Formula (III):

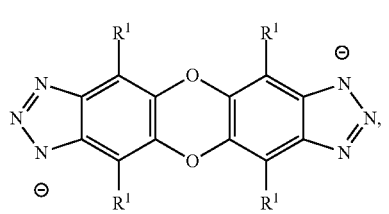

(III)

wherein each $R^1$ is the same or different and is selected from the group consisting of hydrogen, -alkyl, —$NO_2$, —R', —F, —Cl, —Br, —I, —CN, —NC, —$SO_3R'$, —$SO_3H$, —OR', —OH, —SR', —SH, —$PO_3R'$, —$PO_3H$, —$CF_3$, —$NR'_2$, —NHR', and —$NH_2$, and each R' is the same or different and is optionally substituted alkyl or optionally substituted aryl. In some embodiments, $M^2$ is bound to six unsaturated N-heterocyclic aromatic groups having a structures as in Formula (III).

In some embodiments, $M^2$ may be absent in a portion of or all of the MOF. For example, in a non-limiting example, a portion of the MOF may comprise the structure:

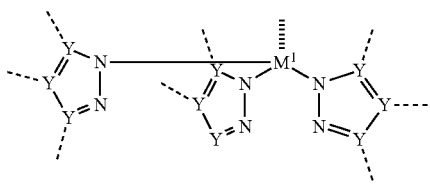

wherein each heteroaromatic ring is a portion of a ligand, and $M^1$ and Y are as described above.

It should be understood that while the ligands depicted above contain 5-membered rings, a heterocycle of any ring size may be substituted in the place of any or all of the ligands coordinated to the metal ion. Furthermore, the MOF may comprise one or more of the above structures. For example, in some embodiments, a significant portion of the MOF comprises both $M^2$ and $M^1$ and at least a portion of the MOF does not comprise $M^2$, and/or at least some of the $M^2$ and $M^1$ are associated with one or more additional ligands, and at least some are not associated with any additional ligands or only a portion of the ligands depicted.

As described above, generally, the MOF comprises at least one ligand comprising at least two unsaturated N-heterocyclic aromatic groups. In some embodiments, at least one ligand comprises two unsaturated N-heterocyclic aromatic groups. In some embodiments, at least one ligand comprises three unsaturated N-heterocyclic aromatic groups. In some embodiments, at least one ligand comprises four unsaturated N-heterocyclic aromatic groups.

The unsaturated N-heterocyclic aromatic group may be selected from any suitable group. Non-limiting examples include pyrrolate, pyrazolate, triazolate, imidazolate, oxazolate, tetrazolate, and pyridinate. Other non-limiting examples include thiazolate, oxadiazolate, purinate, quinolonate, and indolate.

In some embodiments, the unsaturated N-heterocyclic aromatic groups are selected from the group consisting of pyrazolate, triazolate, imidazolate, and tetrazolate. In some embodiments, the unsaturated N-heterocyclic aromatic groups are selected from the group consisting of pyrazolate, pyridinate, imidazolate, triazolate, and tetrazolate. In some embodiments, the unsaturated N-heterocyclic aromatic groups are selected from the group consisting of imidazolate, imidazolate, triazolate, and tetrazolate. In some embodiments, the unsaturated N-heterocyclic aromatic groups are pyrazolates. In certain embodiments, the unsaturated N-heterocyclic aromatic groups are triazolates. Non-limiting examples of triazolate include 1,2,4-triazolate and 1,2,3-triazolate.

For example, in some embodiments, the at least one ligand comprises two or more triazolate, three or more triazolate, or four or more triazolate. In some embodiments, the at least one ligand comprises two triazolates. In some embodiments, the at least one ligand comprises three triazolate. Other N-heterocyclic aromatic groups described herein, and/or combinations of two or more N-heterocyclic aromatic groups described herein, are also possible. For example, in some embodiments, the at least one ligand may comprises at least one triazolate and at least one tetrazolate (e.g., one triazolate and one tetrazolate, two triazolates and one tetrazolate, two triazolates and two tetrazolates, etc.). Other combinations are possible.

In some embodiments, the at least one ligand comprises at least two unsaturated N-heterocyclic aromatic groups arranged about an organic core. The organic core of the ligand comprising at least two unsaturated N-heterocyclic aromatic groups may be any suitable core. In some embodiments, the core is aromatic. Generally, the core comprises a rigid structure formed from fused aryl and/or heteroaryl rings. In some embodiments, the organic core comprises a plurality of fused aryl and/or heteroaryl rings. In some cases, the organic core comprises a plurality of fused aryl rings. In some cases, the organic core comprises one or more of benzyl, thiophenyl, carbazolyl, pyrrolyl, indolyl, and furanyl.

In some embodiments, the at least one ligand comprising at least two unsaturated N-heterocyclic aromatic groups comprises a structure as in:

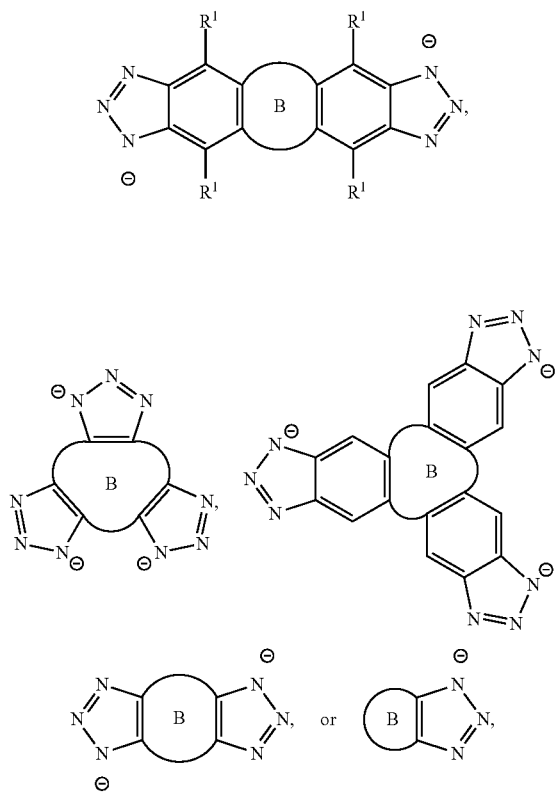

wherein B is an aromatic or heterocyclic core (e.g., comprising one or more aromatic rings, e.g. B can be biphenyl), wherein each $R^1$ is the same or different and is selected from the group consisting of hydrogen (—H), -alkyl (e.g., —CH$_3$), —NO$_2$, —R', —F, —Cl, —Br, —I, —CN, —NC, —SO$_3$R', —SO$_3$H, OR', —OH, —SR', —SH, —PO$_3$R', —PO$_3$H, —CF$_3$, —NR'$_2$, —NHR', and —NH$_2$, wherein each R' is the same or different and is optionally substituted alkyl or optionally substituted aryl. In some embodiments, each $R^1$ is the same and is hydrogen. Non-limiting examples of such ligands include:

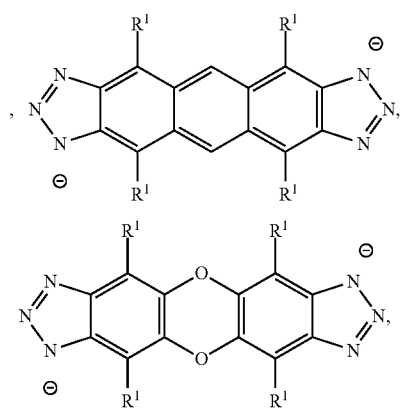

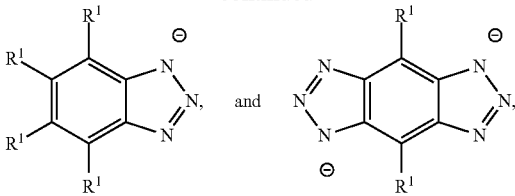

wherein each $R^1$ is the same or different and is selected from the group consisting of hydrogen, -alkyl, —NO$_2$, —R', —F, —Cl, —Br, —I, —CN, —NC, —SO$_3$R', —SO$_3$H, —OR', —OH, —SR', —SH, —PO$_3$R', —PO$_3$H, —CF$_3$, —NR'$_2$, —NHR', and —NH$_2$, wherein each R' is the same or different and is optionally substituted alkyl or optionally substituted aryl. In some embodiments, each $R^1$ is the same and hydrogen.

In certain embodiments, the at least one ligand comprising at least two unsaturated N-heterocyclic aromatic groups comprises the structure as in:

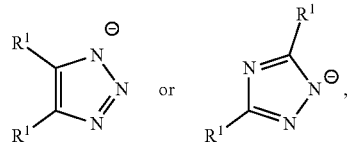

wherein each $R^1$ is the same or different and is selected from the group consisting of hydrogen, -alkyl, —NO$_2$, —R', —F, —Cl, —Br, —I, —CN, —NC, —SO$_3$R', —SO$_3$H, —OR', —OH, —SR', —SH, —PO$_3$R', —PO$_3$H, —CF$_3$, —NR'$_2$, —NHR', and —NH$_2$, wherein each R' is the same or different and is optionally substituted alkyl or optionally substituted aryl.

In some embodiments, more than one type of ligand comprising at least two unsaturated N-heterocyclic aromatic groups may be employed, for example, a first type of ligand and a second type of ligand. The two or more types of ligands may be provided in any suitable ratio. As described herein, the ligand may comprise any combination of unsaturated N-heterocyclic aromatic groups (e.g., at least one triazolate; a combination of triazolates and tetrazolates; at least one tetrazolate, etc.) In some embodiments, following synthetic modification of a MOF or a precursor ligand which is to be utilized to form a MOF, a mixture of types of ligands (or precursor ligands) may be present. For example, the ligands within the MOF or a plurality of precursor ligands that will be used to form a MOF may be synthetically modified (e.g., oxidized) and only a portion of the substituents of the ligands or precursor ligands may be altered. Thus, the ligands within the MOF or the precursor ligands used to form the MOF may comprise a number of different substitution patterns. As a non-limiting example, if the ligand (or precursor ligand) comprises two substituents that are targeted to be modified, upon modification of a plurality of the ligands, for each ligand within the plurality, both substituents may be modified, or only one substituent may be modified, or neither substituent may be modified. Thus, the plurality of ligands may comprise some ligands with both substituents modified, some ligands with only one substituent modified, and some ligands with neither substituent modified.

In a non-limiting embodiment, a metal organic framework (MOF) comprises a plurality of metal ions, each coordinated with at least one ligand, wherein the plurality of metal ions comprises at least two types of metal selected from the group consisting of $Zn^{2+}$, $Cr^{2+}$, and $Cr^{3+}$, tetravalent metals, trivalent metals, and $Zn^{+4}$, and wherein the at least one ligand comprises the structure as in Formula (III):

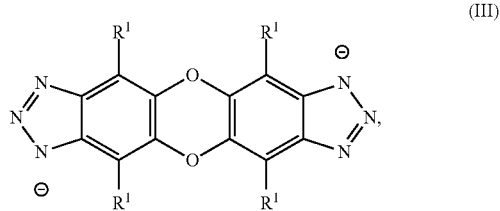

(III)

wherein each $R^1$ is the same or different and is selected from the group consisting of hydrogen, -alkyl, —$NO_2$, —R', —F, —Cl, —Br, —I, —CN, —NC, —$SO_3R'$, —$SO_3H$, —OR', —OH, —SR', —SH, —$PO_3R'$, —$PO_3H$, —$CF_3$, —$NR'_2$, —NHR', and —$NH_2$, and each —R' is the same or different and is optionally substituted alkyl or optionally substituted aryl. In some embodiments, each ligand with the exception of auxiliary ligands has a structure as in Formula (III). In some embodiments, each $R^1$ is hydrogen. In some embodiments, the metal ions are selected from the group consisting of $Zn^{2+}$, $Cr^{2+}$, and $Cr^{3\pm}$.

The MOFs may be synthesized using methods known in the art (e.g., see *Chem. Eur. J.* 2011, 17, 1837-1848; *Chem. Eur. J.* 2015, 21, 8188-8199). For example, in some cases, a method of synthesizing a MOF comprises exposing a plurality of metal ions to a plurality of precursor ligands to form a MOF comprising a portion of the plurality of metal ions each coordinated with at least one ligand, wherein the at least one ligand comprises at least two unsaturated N-heterocyclic aromatic groups arranged about an organic core. Non-limiting examples of ligands comprises at least unsaturated N-heterocyclic aromatic groups arranged about an organic core are described herein. In some embodiments, the metal ion is provided as a salt, and the at least one precursor ligand comprises at least two N-heterocyclic aromatic groups which, during the course of the reaction are deprotonated to form the corresponding ligand (e.g., comprising unsaturated N-heterocyclic aromatic groups). For example, the precursor ligand may be deprotonated to have a charge of (−1), or (−2), or (−3), or (−4). Exemplary precursor ligands are described herein.

In some embodiments, an MOF comprising at least a first type of metal ion and a second type of metal ion may be prepared by metal exchange of a substantially similar MOF comprising only a single type of metal ion. In some embodiments, the metal exchange may be carried out by adding the first type of metal ion to solution comprising the MOF comprising only the second type of metal ion. For example, an MOF comprising zinc ions may be exposed to a plurality of a first type of metal ions (e.g., in solution) and at least one zinc ion may be exchanged by a first type of metal ion (e.g., $Cr^{2+}$ or $Cr^{+3}$). In some embodiments, only one of the second type of metal ions is exchanged with the first type of metal ion. In some embodiments, one or less of the second type of metal ions is exchanged with the first type of metal ion. In other embodiments, more than one of the second type of metal ions is replaced with the first type of metal ion.

In some embodiments, following synthesis of an MOF (e.g., prior to or following metal exchanged), the MOF may be modified. For example, the ligands of the MOF may be modified to include one or more functional groups and/or the one or more of the functional groups of the ligand may be modified. The ability to modify in the MOF following synthesis of the MOF is beneficial as the properties of the MOFs may be more readily tuned. In some embodiments, the MOF is modified to include hydrophilic groups. The MOF may be modified using any suitable technique. In some embodiments, the MOF is exposed to oxidative conditions to associate new functional groups and/or modify currently present functional groups that are present on the ligand of the MOF. As a non-limiting example, a ligand of the MOF may comprise one or more alkyl sulfide groups, and the MOF may be exposed to oxidizing conditions (e.g., dimethyldioxirane) to modify the alkyl sulfide groups into alkyl sulfoxides or alkyl ethyl sulfones groups.

In some embodiments, the MOFs formed may comprise little or no excess metal ions. That is, the MOF comprises essentially no metal ions which are not coordinated with a ligand comprising at least two unsaturated N-heterocyclic aromatic groups (i.e., "free metal ions"). In some embodiments, the MOF comprises less than about 0.5 wt %, or less then about 0.4 wt %, or less then about 0.3 wt %, or less than about 0.2 wt %, or less then about 0.1 wt %, or less than about 0.05 wt %, or less than about 0.03 wt %, or less than about 0.02 wt %, or less than about 0.01 wt %, or less than about 0.005 wt %, or less than about 0.001 wt % of free metal ions. Those of ordinary skill in the art will be aware of methods for determining the amount of free metal ions, for example, using XPS.

In some embodiments, each precursor ligand comprises two N-heterocyclic aromatic groups. In some embodiments, each precursor ligand comprises three N-heterocyclic aromatic groups. In some embodiments, each precursor ligand comprises four N-heterocyclic aromatic groups. The N-heterocyclic aromatic group for the precursor ligand may be selected from any suitable group. Non-limiting examples are pyrrole, pyrazole, triazole, imidazole, and tetrazole. In some embodiments, the N-heterocyclic aromatic groups are selected from the group consisting of pyrazole, triazole, imidazole, and tetrazole. In some embodiments, the N-heterocyclic aromatic groups are selected from the group consisting of pyrazole, imidazole, and tetrazole. In some embodiments, the N-heterocyclic aromatic groups are pyrazoles. The organic core of the precursor ligand comprising at least two N-heterocyclic aromatic groups may be as described here.

In some embodiments, each precursor ligand has the structure:

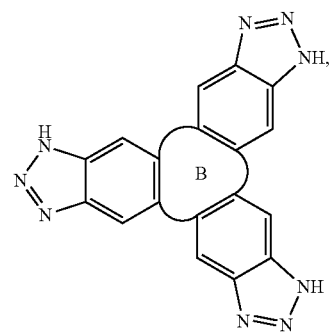

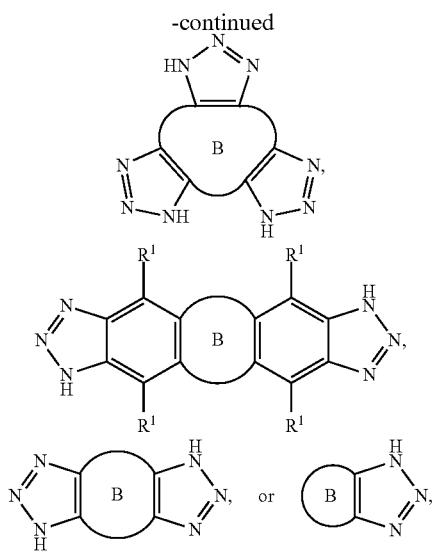

wherein B is an aromatic or heterocyclic core, wherein each R¹ is the same or different and is selected from the group consisting of hydrogen, -alkyl, —NO₂, —R', —F, —Cl, —Br, —I, —CN, —NC, —SO₃R', —SO₃H, —OR', —OH, —SR', —SH, —PO₃R', —PO₃H, —CF₃, —NR'₂, —NHR', and —NH₂, wherein each R' is the same or different and is optionally substituted alkyl or optionally substituted aryl. In some embodiments, each R¹ is the same and is hydrogen. Non-limiting examples of such ligands include:

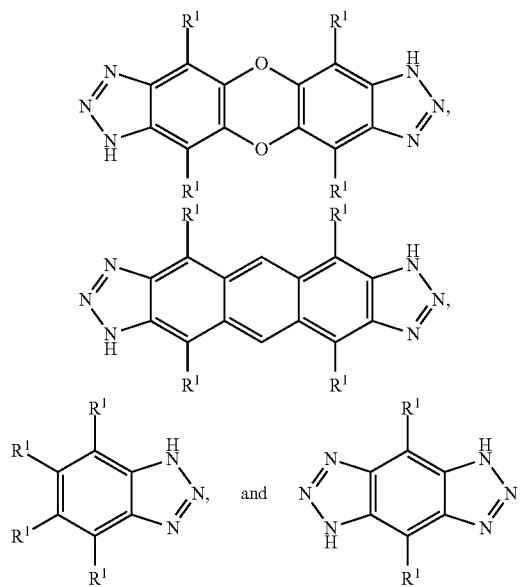

wherein each R¹ is the same or different and is selected from the group consisting of hydrogen, —NO₂, —R', —F, —Cl, —Br, —I, —CN, —NC, —SO₃R', —SO₃H, —OR', —OH, —SR', —SH, —PO₃R', —PO₃H, —CF₃, —NR'₂, —NHR', and —NH₂, wherein each R' is the same or different and is optionally substituted alkyl or optionally substituted aryl. In some embodiments, each R¹ is the same and hydrogen.

In some embodiments, each precursor ligand has a structure as in:

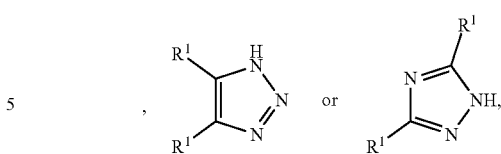

wherein each R¹ is the same or different and is selected from the group consisting of hydrogen, —NO₂, —R', —F, —Cl, —Br, —I, —CN, —NC, —SO₃R', —SO₃H, —OR', —OH, —SR', —SH, —PO₃R', —PO₃H, —CF₃, —NR'₂, —NHR', and —NH₂, wherein each R' is the same or different and is optionally substituted alkyl or optionally substituted aryl. In a particular embodiment, each R¹ is the same and hydrogen.

The metal ion and the ligand may be provided in any suitable amounts. In some embodiments, the mole ratio of the metal ion to the ligand may be based upon the coordination of the metal ion to the ligand. For example, in embodiments, where the ligand is coordinated with three metal ions, and each metal ion is associated with two ligands, the mole ratio of the metal ion to the ligand may be at least 3:2. As another example, in embodiments, where the ligand is coordinated with two metal ions, and each metal ion is associated with one ligand, the mole ratio of the metal ion to the precursor ligand may about 2:1. In some embodiments, the ligand is providing in slight mole excess.

In some embodiments, the metal ions are provided as a salt. Non-limiting examples of salts chloride, fluoride, bromide, iodide, triflate, $BF_4$, $PF_6$, $NO_3^-$, $SO_4^{2-}$, and $ClO_4^-$ salts. In some cases, the salt is $SO_4^{2-}$.

Any suitable solvent may be utilized in the synthetic methods of forming the MOFs described herein. Non-limiting examples of solvents include water, methanol, ethanol, propanol, benzene, p-cresol, toluene, xylene, diethyl ether, glycol, diethyl ether, petroleum ether, hexane, cyclohexane, pentane, methylene chloride, chloroform, carbon tetrachloride, dioxane, tetrahydrofuran (THF), dimethyl sulfoxide (DMSO), dimethylformamide, hexamethyl-phosphoric triamide, ethyl acetate, pyridine, triethylamine, picoline, mixtures thereof, or the like.

The MOFs may be synthesized at any suitable temperature. In some cases, the reaction is carried out at about room temperature (e.g., about 25° C., about 20° C., between about 20° C. and about 25° C., or the like). In some cases, however, the reaction is carried out at temperatures below or above room temperature. In some embodiments, the reaction is carried at a temperature between about 25° C. and about 200° C., about 25° C. and about 150° C., or between about 50° C. and about 200° C., or between about 50° C. and about 150° C., or between about 100° C. and about 150° C.

In some embodiments, the MOFs may be synthesized in the presence of a base (e.g., to aid in deprotonation of the ligand). Non-limiting examples of bases include NR"₃ wherein each R" is the same or different and is hydrogen, optionally substituted alkyl, or optionally substituted aryl, and QOH, wherein Q is a cation (e.g., a metal cation, a semi-metal cation, NH₄).

In some embodiments, the MOFs may be synthesized in an inert atmosphere. For example, the reactions may be carried out in or under an inert nitrogen or argon atmosphere (e.g., using standard Schlenk techniques and/or in an inert-atmosphere glovebox).

MOFs synthesized using the methods described herein may be purified using techniques known to those of ordinary skill in the art. In some embodiments, a synthesized MOF may be washed, sometimes involving a Soxhlet extractor, boiled, and/or sonicated (e.g., to remove excess starting materials).

Definitions

For convenience, certain terms employed in the specification, examples, and appended claims are listed here.

As used herein, the term "reacting" refers to the forming of a bond between two or more components to produce a stable, isolable compound. For example, a first component and a second component may react to form one reaction product comprising the first component and the second component joined by a covalent bond. That is, the term "reacting" does not refer to the interaction of solvents, catalysts, bases, ligands, or other materials which may serve to promote the occurrence of the reaction with the component(s).

Definitions of specific functional groups and chemical terms are described in more detail below. For purposes of this invention, the chemical elements are identified in accordance with the Periodic Table of the Elements, CAS version, *Handbook of Chemistry and Physics,* 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$;

—CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1-20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3-14 carbon atoms, each of which may be substituted or unsubstituted. Substituents include, but are not limited to, any of the previously mentioned substituents, i.e., the substitutes recited for aliphatic moieties, or for other moieties as disclosed herein, resulting in the formation of a stable compound. In some cases, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein may be attached via an alkyl or heteroalkyl moiety and thus also include (alkyl)aryl, -(heteroalkyl)aryl, -(heteroalkyl)heteroaryl, and (heteroalkyl)heteroaryl moieties. Thus, as used herein, the phrases "aryl or heteroaryl moieties" and "aryl, heteroaryl, -(alkyl)aryl, -(heteroalkyl)aryl, -(heteroalkyl)heteroaryl, and -(heteroalkyl)heteroaryl" are interchangeable. Substituents include, but are not limited to, any of the previously mentioned substituents, i.e., the substituents recited for aliphatic moieties, or for other moieties as disclosed herein, resulting in the formation of a stable compound.

It will be appreciated that aryl and heteroaryl groups (including bicyclic aryl groups) can be unsubstituted or substituted, wherein substitution includes replacement of one or more of the hydrogen atoms thereon independently with any one or more of the following moieties including, but not limited to: aliphatic; alicyclic; heteroaliphatic; heterocyclic; aromatic; heteroaromatic; aryl; heteroaryl; alkylaryl; heteroalkylaryl; alkylheteroaryl; heteroalkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$F; —CHF$_2$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)R$_x$; —S(O)$_2$R$_x$; —NR$_x$(CO)R$_x$ wherein each occurrence of R$_x$ independently includes, but is not limited to, aliphatic, alicyclic, heteroaliphatic, heterocyclic, aromatic, heteroaromatic, aryl, heteroaryl, alkylaryl, alkylheteroaryl, heteroalkylaryl or heteroalkylheteroaryl, wherein any of the aliphatic, alicyclic, heteroaliphatic, heterocyclic, alkylaryl, or alkylheteroaryl substituents described above and herein may be substituted or unsubstituted, branched or unbranched, saturated or unsaturated, and wherein any of the aromatic, heteroaromatic, aryl, heteroaryl, -(alkyl)aryl or -(alkyl)heteroaryl substituents described above and herein may be substituted or unsubstituted. Additionally, it will be appreciated, that any two adjacent groups taken together may represent a 4, 5, 6, or 7-membered substituted or unsubstituted alicyclic or heterocyclic moiety. Additional examples of generally applicable substituents are illustrated by the specific embodiments described herein.

The terms "halo" and "halogen" as used herein refer to an atom selected from the group consisting of fluorine, chlorine, bromine, and iodine.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

The following examples are intended to illustrate certain embodiments of the present invention, but do not exemplify the full scope of the invention.

EXAMPLES

Example 1

Summary: The manufacture of advanced polyolefins has been enhanced by the development of single site heterogeneous catalysis. Metal organic frameworks (MOFs) show great potential as heterogeneous catalysts that may be designed and tuned on the molecular level. In this example, cation exchange of reactive metals into the MOF material MFU-4l serves to establish a general platform for selective olefin polymerization in a high surface area solid ideal for industrial catalysis. Characterization of polyethylene produced by these materials demonstrates both molecular and morphological control. Notably, reactivity approaches single site catalysis as evidenced by polydispersity indices as low as 2.00 for the resulting polymer.

The MOF utilized in this example comprises MFU-4l (MFU-4l=Zn$_5$Cl$_4$(BTDD)$_3$, H$_2$BTDD=bis(1H-1,2,3-triazolo[4,5-b], [4',5'-i])dibenzo[1,4]dioxin). This cluster comprises five zinc atoms, one central atom coordinated octahedrally by six nitrogens and four peripheral Zn—Cl units pointing toward the center of the pore (FIG. 1). The latter Zn position has been previously shown to undergo cation exchange under mild conditions and features facial coordination by three triazolate nitrogen atoms. This soft, tripodal coordination environment bears analogy to the post-metallocene family of nitrogen-based ligands for ethylene polymerization.

Results and Discussion.

The initial evaluation of cation exchange with various titanium and chromium precursors emulated those for other metals in MFU-4l. After evaluating a range of solvents and temperatures observed by ICP-AES, the incorporation of chromium and titanium into the material MFU-4l was determined under mild conditions (see Table 1). Soaks performed at elevated temperatures with these sensitive cations predominantly resulted in decomposition of the MOF or exchange salt. At room temperature and in DMF, chromium replaced all four exchangeable zinc atoms using only 20 equivalents of $CrCl_3(THF)_2(H_2O)$ and catalytic $CrCl_2$. Exchange with 100 equivalents of $CrCl_2$ replaced slightly more than two zinc atoms per SBU under similar conditions. Successful exchange with titanium chlorides utilized changing the solvent to acetonitrile. Treatment of MFU-4l with 50 equivalents of $TiCl_3(THF)_3$ lead to substitution of nearly 2 equivalents of zinc per SBU, while 0.18 zinc atoms per SBU were displaced when 50 equivalents of $TiCl_4(THF)_2$ was used.

Figure 2:
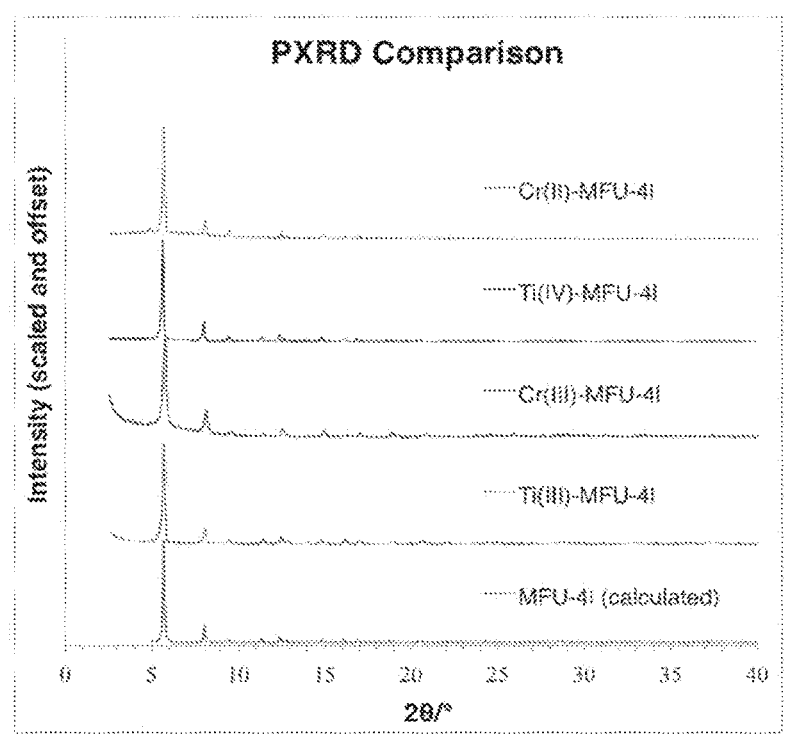
FIG. 2 shows a comparison of exchanged structures by powder x-ray diffraction (PXRD), according to some non-limiting embodiments.
Figure 3:
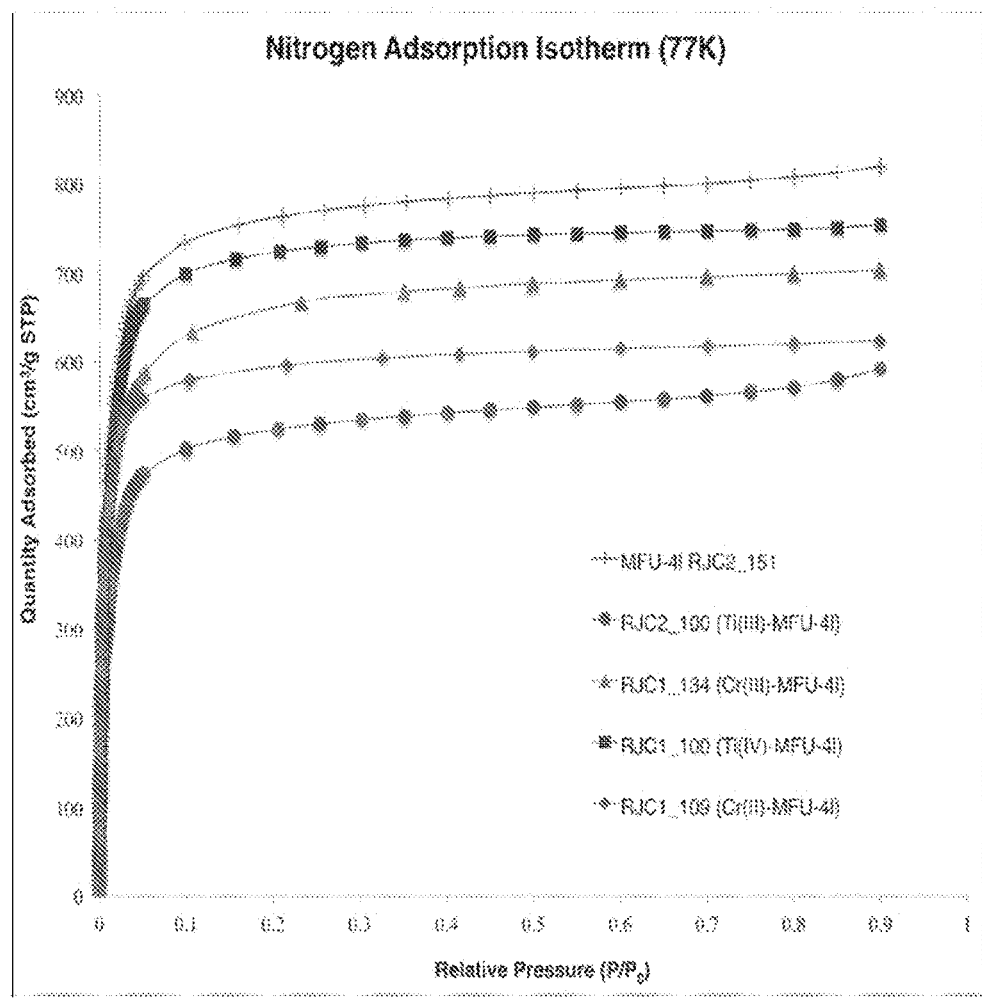
FIG. 3 shows a comparison of exchanged materials by nitrogen adsorption (77 K), according to some non-limiting embodiments.

Structural analysis of the metal chloride-treated materials demonstrates that the lattice structure of MFU-4l has been preserved. Powder x-ray diffraction patterns agree well with the parent material MFU-4l, indicating preservation of the MOF crystal structure (FIG. 2). Nitrogen adsorption analyses indicate high saturation loadings and Braunauer-Emmet Teller surface areas that compare favorably with the parent MOF (FIG. 3). Taken together with the detection of zinc in the supernatant by ICP-AES, these results are most consistent with incorporation of chromium and titanium into the SBU by cation exchange, as opposed to deposited in some other form. Likewise, the materials exchanged with the air sensitive $CrCl_2$ and $TiCl_3$ exhibit an immediate color change upon exposure to air, while the $CrCl_3$- and $TiCl_4$-exchanged samples do not, suggesting conservation of the oxidation state upon cation exchange. This assumption would account for the significant differences observed in loading efficiency and in catalytic activity between samples exchanged with the same metal in different oxidation states (see below).

With MOF samples suitably loaded with catalytically active metals, heterogeneous polymerization was explored. When treated with methylaluminoxane (MAO) or triethylaluminum in toluene and then pressurized with ethylene, all four samples polymerize ethylene catalytically. Activities range from 1860 turnovers per hour for Ti(IV)-MFU-4l to 15,000 turnovers per hour for Ti(IV)-MFU-4l (Table 2), noting that these are lower bound estimates for catalytic turnover assuming that all exchanged sites are active. In contrast, no observable oligomerization or polymerization activity was detected with the all-zinc precursor MFU-4l and MAO under similar conditions, attributing catalytic activity to the exchanged transition metals. Turnover scales roughly with ethylene pressure, indicating that catalytic saturation has not been achieved under these conditions. Notably, the product is always isolated as a free-flowing powder.

This product was assigned as a high molecular weight linear polymer, high density polyethylene (HDPE) by a variety of molecular characterization techniques. IR spectra of purified samples were dominated by peak signals corresponding to the methylene group (2917, 2850, 1472, and 718 $cm^{-1}$), with no readily discernible methyl peak (1380 $cm^{-1}$) assignable to side chains and end groups. Crystallinity and peak melting temperature were evaluated by differential scanning calorimetry (DSC), using a two-scan method for thermally resetting the polymers in order to avoid inconsistencies in the thermal and mechanical history of samples. In all samples, high crystallinities (50-65%) indicate linear poly-ethylene, while peak melting temperatures (130-137° C.) are consistent with a high molecular weight polymer. In order to verify this assignment, the polymers were further characterized using high temperature gel permeation chromatography (HT-GPC). These data confirm that the polymers are of commercially relevant molecular weight range, with weight-averaged molecular weights (Mw) ranging from $5.27 \times 10^5$ for polymer produced by Cr(III)-MFU-4l to $1.18 \times 10^6$ for the polymer produced by Ti(IV)-MFU-4l. The titanium catalysts produce a polymer of consistently higher molecular weight than the chromium catalysts, a conclusion consistent with the generally lower second-scan crystallinities obtained for the titanium-produced polymers as evaluated by DSC.

Statistical analysis of the molecular weight distribution obtained by HT-GPC provides evidence for single site catalysis. The polydispersity index (PDI) obtained for these samples ranges from 8.3 for Cr(III)-MFU-4l down to exactly 2.0 for Ti(IV)-MFU-4l. A PDI of 2.0 corresponds to a single ideal Shultz-Flory distribution, as would be observed for a single-site catalyst with a homogeneous distribution of the monomer. It is believed that, this is the first example of single site olefin polymerization behavior having been demonstrated in a MOF. Conversely, the observation of a higher PDI for other samples does not necessarily rule out single site reactivity in those samples. Note that PDI consistently increases with loading of chromium or titanium, and that a PDI of 2.0 is achieved in the limit of fully site isolated active sites. Without wishing to be bound by theory, on one hand, increasing the number of exchanged metals per node could lead to multisite reactivity due to variability in the precise loading per node or the chemical condition at each metal site. On the other hand, a higher catalyst loading would contribute to mass-transport limited concentration gradients in the monomer due to more rapid local consumption of ethylene. The pressure dependence of the molecular weight distribution provides evidence for the second hypothesis. For both Cr(III)-MFU-4l and Ti(III)-MFU-4l, Mw increases consistently as the ethylene pressure is decreased, demonstrating that active sites which experience a different local concentration of ethylene will produce polyethylene of a different molecular weight distribution. Along those lines, the decrease of PDI with decreasing pressure suggests that concentration gradient effects are mitigated under conditions of lower reaction rate.

Control over the polymer's molecular weight using chain transfer agents was also evaluated. Hydrogen is a limiting chain transfer agent due to cost, safety, and the simplicity associated with coloading gaseous reagents. Treatment of Ti(III) with an increasing ratio of hydrogen to ethylene lead to an increase in second-scan crystallinity from 58% to 77%, corresponding to a 4.3-fold decrease in $M_w$ (Table 3). The corresponding increase in PDI may be attributed to local variations in the ratio of ethylene to hydrogen, which are consumed at very different rates.

Figure 4:
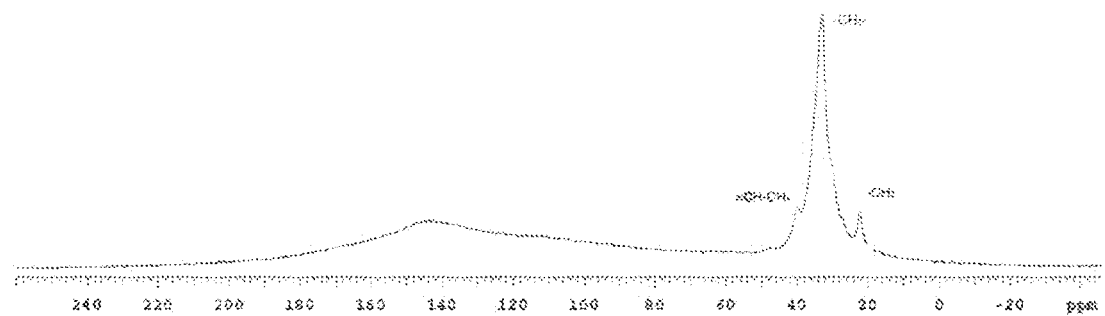
FIG. 4 shows a solid state magic-angle spinning $^{13}C$ NMR of ethylene/propylene copolymer produced by Ti(III)-MFU-4l, according to a non-limiting embodiment.

Having evaluated the homopolymerization activity of the cation-substituted MFU-4l samples, the copolymerization of ethylene and a-olefins was evaluated. Treatment of various precatalysts with a 1:1 ratio of propylene and ethylene lead to polymers with a significant decrease in second-scan crystallinity relative to the homopolymers produced by the same catalyst, consistent with propylene incorporation. Solid-state 13C-NMR analysis confirmed that this is the case. While the ethylene homopolymers demonstrated displayed a single peak (33 ppm) indicative of a linear polyethylene without side chain branching, the spectra for the copolymers include methyl (22 ppm) and methine (40 ppm) signals indicative of propylene incorporation (FIG. 4). Quantification of the methyl to methylene ratios are consistent with incorporation efficiencies as high as 15% for Ti(III)-MFU-4l.

In summary, four novel chromium- and titanium containing MOFs prepared by cation exchange in MFU-4l were prepared. These MOFs are active precatalysts for the polymerization of ethylene to a highly molecular weight, linear polymer. Polydispersities as low as 2.00 in the resulting polymer demonstrate the potential of these MOFs to act as single site catalysts. Coloading experiments with hydrogen and propylene demonstrate control over the molecular weight and the potential for olefin copolymerization. These results and the production of polymer as a free flowing powder demonstrate both molecular and morphological control in olefin polymerization.

TABLE 1

Results obtained from cation exchange.

$$Zn_5Cl_4(BTDD)_3 \xrightarrow[\text{room temp.}]{MCl_x \text{ (50 equiv.)}} Zn_{5-y}M_yCl_z(BTDD)_3$$

| Cation | Conditions | Incorporation[1] |
|---|---|---|
| Cr(III) | CrCl$_3$•3THF, DMF, CrCl$_2$ (0.5 equiv) | 4.0:1.0 (Cr:Zn) |
| Cr(II) | CrCl$_2$, DMF | 2.4:2.6 (Cr:Zn) |
| Ti(IV) | TiCl$_4$•2THF, CH$_2$CN | 0.2:4.8 (Ti:Zn) |
| Ti(III) | TiCl$_3$•3THF, CH$_3$CN | 2.0:3.0 (Ti:Zn) |

[1]Metal ratio determined by ICP-MS or ICP-AES.

TABLE 2

Activities and polymer analysis for ethylene homopolymerization

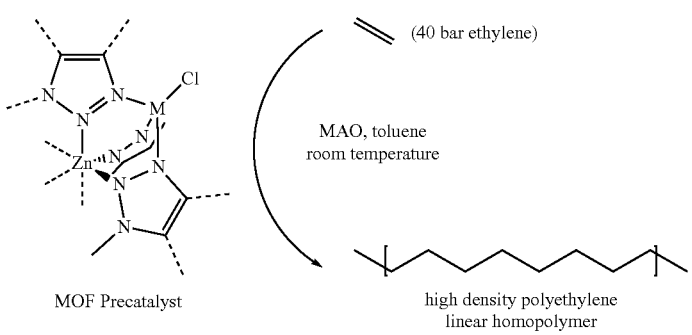

| MOF | turnover[a] | % C[b] | T$_m$[b] | M$_w$[c] | PDI[c] |
|---|---|---|---|---|---|
| Cr(III)-MFU-4l | 3,420 hr$^{-1}$ | 66% | 133° C. | 5.27 × 10$^5$ | 5.44 |
| Cr(II)-MFU-4l | 4,770 hr$^{-1}$ | 60% | 134° C. | 6.72 × 10$^5$ | 6.93 |
| Ti(III)-MFU-4l | 15,000 hr$^{-1}$ | 58% | 135° C. | 1.01 × 10$^6$ | 3.12 |
| Ti(IV)-MFU-4l | 1,860 hr$^{-1}$ | 50% | 135° C. | 1.09 × 10$^5$ | 1.99 |

[a]Mol ethylene incorporated into the isolated polymer/mol of chromium or titanium
[b]Evaluated by differential scanning calorimetry, % C = percent crystallinity, Tm = peak melting temperature
[c]Evaluated gel permeation chromatography, Mw = weight-average molecular weight, PDI = polydispersity index

TABLE 3

Molecular weight control with hydrogen.

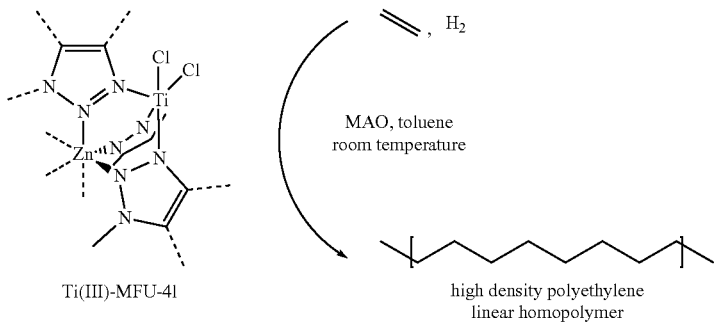

Ti(III)-MFU-4l → high density polyethylene linear homopolymer (MAO, toluene, room temperature)

| $P_{ethylene}$ | $P_{H2}$ | turnover[a] | % C[b] | $T_m$[b] | $M_w$[c] | PDI[c] |
|---|---|---|---|---|---|---|
| 40 bar | 0 bar | 15,000 hr$^{-1}$ | 58% | 135° C. | 1.01 × 10$^6$ | 3.12 |
| 13 bar | 2 bar | 3,380 hr$^{-1}$ | 67% | 138° C. | 4.73 × 10$^5$ | 5.91 |
| 10 bar | 10 bar | 1,620 hr$^{-1}$ | 77% | 135° C. | 2.35 × 10$^5$ | 6.75 |

[a]Mol ethylene incorporated into the isolated polymer/mol of chromium or titanium
[b]Evaluated by differential scanning calorimetry, % C = percent crystallinity, Tm = peak melting temperature
[c]Evaluated gel permeation chromatography, Mw = weight-average molecular weight, PDI = polydispersity index

Example 2

The following examples provide information about the materials and methods used in connection with Example 1. General Information.

Methylaluminoxane (10% w/w in toluene, Sigma), triethylaluminum (neat, Sigma), ethylene (99.9%, Airgas), and propylene (, Airgas), were used as received. Other commercial reagents were purified prior to use following the guidelines of Perrin and Armarego (e.g., see Perrin, D. D.; Armarego, W. L. F. Purification of Laboratory Chemicals. 3rd ed., Pergamon Press, Oxford, 1988). All solvents were purified according to the method of Grubbs (e.g., see Pangborn, A. B.; Giardello, M. A.; Grubbs, R. H.; Rosen, R. K.; Timmers, F. J. Organometallic. 1996, 15, 1518). "Degassed" solvents were further treated by three cycles of freeze-pump-thaw, stored over activated molecular sieves overnight, and subsequently handled only in a nitrogen glovebox. Suspensions of organic solvents and polymer products were concentrated under reduced pressure on a Büchi rotary evaporator. Sonication was performed using a VWR bath sonicator. Yields refer to purified compounds, unless otherwise indicated.

Powder X-ray diffraction (PXRD) patterns were recorded on a Bruker Advance II diffractometer equipped with θ/2θ Bragg-Brentano geometry and Ni-filtered CuKα radiation (Kα1=1.5406 Å). Unless otherwise noted, PXRD analysis was performed immediately after samples were exposed to air. Benchtop infrared (IR) spectra were recorded on a Bruker Tensor 37 instrument with a germanium attenuated total reflectance (ATR) sample holder. Air-free IR spectra were recorded on a Bruker Alpha with a diamond tip ATR sample holder housed in a nitrogen glovebox. Nitrogen adsorption isotherms were performed using a Micromeritics ASAP 2020 Surface Area and Porosity Analyzer and UHP grade nitrogen (99.999% purity).

Elemental analysis was performed by Robertson Microlit Laboratories, using combustion analysis for carbon, nitrogen, and hydrogen and inductively coupled optical emission spectroscopy (ICP-OES) for transition metals. Additional transition metal analysis was provided by inductively coupled plasma mass spectrometry (ICP-MS) on an Agilent 7900 at the MIT Center for Environmental Health Sciences (MIT CEHS). Calibration standards were prepared for ICP-MS analysis using analytical standard solutions purchased from Ricca Chemicals and 1% HNO3 solution (prepared from EMD Millipore Omnitrace® HNO$_3$ and ultrafiltered water).

Experimental Data for Metal-Organic Framework Synthesis

Cr(III)-MFU-4l-In a nitrogen glovebox (using dry, degassed solvent), a bottle containing a suspension of MFU-4l (e.g., see Denysenko, D.; Grzywa, M.; Tonigold, M.; Streppel, B.; Krkljus, I.; Hirscher, M.; Mugnaioli, E.; Kolb, U.; Hanss, J.; Volkmer, D. Chem. Eur. J. 2011, 17, 1837) (500 mg, 0.396 mmol) and N,N-dimethylformamide (75 mL) was treated with a homogeneous solution of CrCl2 (24 mg, 0.198 mmol, 0.5 equivalents), CrCl$_3$(THF)$_2$(H$_2$O) (e.g., see Jeon, J. Y.; Park, J. H.; Park, D. S.; Park, S. Y.; Lee, C. S.; Go, M. J.; Lee, J.; Lee, B. Y. Inorg. Chem. Commun. 2014, 44, 148. (b) Shamir, J. Inorganica Chimica Acta 1989, 156, 163-164. (c) House, D. A.; Wang, J.; Niewenhuyzen, M. Inorganica Chimica Acta 1995, 237, 37-46) (5.20 g, 16.2 mmol, 41 equivalents), and N,N-dimethylformamide (100 mL). The reaction was maintained under these conditions at ambient temperature for seven days, after which the bottle was removed from the nitrogen glovebox. A green solid was obtained by filtration, rinsing with methanol (200 mL). The product was then soaked in methanol (200 mL) for 24 hours in a sealed bottle at 60° C., and then filtered. This hot soaking procedure was repeated four times. The green solid was then dried under vacuum at 150° C. for 12 hours, turning from light green to bright yellow and achieving a pressure of <10$^{-5}$ torr. The material was subsequently handled in a nitrogen or argon glovebox from this point onward. Samples exposed to air would slowly turn green. The product was analyzed by PXRD, IR, and nitrogen adsorption (see below). Elemental analysis indicated a Cr:Zn molar ratio of 3.95:1 (ICP-OES). Elemental analysis for a theoretical formula of Cr$_{3.99}$Zn$_{1.01}$Cl$_8$(BTDD)$_3$·4.88 H$_2$O (Cr$_{3.99}$Zn$_{1.01}$Cl$_{7.99}$C$_{36}$N$_{18}$H$_{12}$O$_6$·4.88 H$_2$O): carbon (theoretical: 30.08%, experimental: 30.49%, difference 0.41%), hydrogen (theoretical: 1.53%, experimental: 1.40%, difference 0.13%), nitrogen (theoretical: 17.54%, experimental 16.76%, difference 0.78%). BET Surface Area: 2549.52±12.7 m2/g ($N_2$, 77K).

Cr(II)-MFU-4l—In a nitrogen glovebox (using dry degassed solvent), a bottle containing a homogeneous solution of MFU-4l (e.g., see Denysenko, D.; Grzywa, M.; Tonigold, M.; Streppel, B.; Krkljus, I.; Hirscher, M.; Mugnaioli, E.; Kolb, U.; Hanss, J.; Volkmer, D. Chem. Eur. J. 2011, 17, 1837) (500 mg, 0.396 mmol) and N,N-dimethylformamide (100 mL) was treated with $CrCl_2$ (2.43 g, 19.8 mmol, 50 equivalents). The resulting green suspension was maintained under these conditions for 7 days, with occasional gentle stirring. A green material was then obtained by filtration, rinsing with N,N-dimethylformamide. The soak supernatant and first rinse were combined and elemental analysis indicated a Cr:Zn ratio of 15:1 (ICP-MS). The product was soaked for three days in N,N-dimethylformamide, removing the solvent by filtration every 24 hours. The product was then soaked in hot tetrahydrofuran (60° C.) under air free conditions for three days, changing the supernatant every 24 hours. The product was then heated to 180° C. under vacuum, achieving a pressure of $<10^{-5}$ ton after 18 hours. Samples exposed to air would immediately turn brown and then slowly turn light green. The material was analyzed by PXRD, IR, and nitrogen adsorption (see below). Elemental analysis indicated a Zn:Cr molar ratio of 1.04: 1.

General Procedures for Olefin Polymerization.

High Pressure Olefin Polymerization. In a nitrogen glovebox, a Parr reactor was charged with precatalyst, toluene, activator, and a stirbar. The reactor was then tightly sealed, transferred out of the glovebox, and pressurized with ethylene (with high speed stirring). The pressure was maintained at the specified pressure by keeping the reactor connected to the ethylene tank. After the specified amount of time was up, the reaction was carefully vented, opened to air, and then quenched with methanol. The resulting suspension was transferred to a round bottom flask using excess methanol, and then the solvent was removed in vacuo. The resulting white solid was treated with 100 mL of methanol and 10 mL HCl, and then sonicated for 30 minutes. The product was obtained by filtration and then dried in vacuo. The product was analyzed by IR, differential scanning calorimetry, and high temperature gel permeation chromatography. Differential Scanning calorimetry Analysis (DSC). Samples were analyzed on a Texas Instruments Q100 using a crimped standard sample pan. A double-scan method was used in order to eliminate inconsistencies due to variation in the thermal or mechanical history of individual polyethylene samples. Samples were equilibrated at 0° C. and then heated to 200° C. at a rate of 10° C. per minute. After holding 200° C. for two minutes the sample was cooled to 0° C. This cycle was repeated under the same conditions. Heats of fusion ($\Delta H_f$) and melting temperature maxima ($T_m$) were reported from the second heating cycle. Percent Crystallinities (%$_C$) were calculated based on a theoretical heat of fusion of 293 J/g (e.g., see TA123, "Determination of Polymer Crystallinity by DSC," TA Instruments, New Castle, Del.).

High Temperature Gel Permeation Chromatography (HT-GPC). Samples were analyzed by Creative Proteomics (Shirley, N.Y.). Polyethylene powders were dissolved in 1,3,5-trichlorobenzene at 160° C., at a concentration of 0.10 mg/mL. A 200 µL aliquot of this solution would be injected onto a 3×pL Olexis column, eluted at a rate of 1.00 mL per minute and analyzed with an inline RI detector. The column was heated to 150° C. throughout the analysis and the elute was stabilized with 0.0125% BHT. Molecular weight distributions were calculated based on commercial polystyrene standards.

Experimental Data for Olefin Polymerization.

Table 2, entry 1—By the usual method with Cr(III)-MFU-4l (5.0 mg, 3.7 µmol), MAO (1.25 mL, 10% by weight in toluene, d=0.875, 1.89 mmol), 3.75 mL toluene, and 40 bar ethylene, for one hour. Product: 1.42 g, 50.6 mmol, 3,420 turnovers per Cr.

Table 2, entry 2—By the usual method with Cr(II)-MFU-4l (5.0 mg, 4.07 µmol), MAO (1.0 mL, 10% by weight in toluene, d=0.875, 1.51 mmol), 4.0 mL toluene, and 40 bar ethylene, for one hour. Product: 1.36 g, 48.5 mmol, 4770 turnovers per Cr.

Table 2, entry 3—By the usual method with Ti(III)-MFU-4l (5.0 mg, 0.0039 mmol) MAO (0.7 mL, 10% by weight in toluene, d=0.875, 1.06 mmol), 4.0 mL toluene, and 40 bar ethylene, for one hour. Product: 2.543 g, 90.8 mmol, 15,000 turnovers per Ti. DSC analysis (thermal parameters, second scan): 171.2 J/g, 58% crystallinity, 135.4° C.

Table 2, entry 4—By the usual method with Ti(IV)-MFU-4l (10 mg, 0.0079 mmol) MAO (1.0 mL, 10% by weight in toluene, d=0.875, 1.51 mmol), 4.0 mL toluene, and 40 bar ethylene, for one hour. Product: 292 mg, 10.4 mmol, 7429 turnovers. DSC analysis (thermal parameters, second scan): 146.2 J/g, 50% crystallinity, 134.5° C.

Example 3

This example describes the ethylene homopolymerization with Zr(IV)-MFU-4l. In a nitrogen glovebox, a 50 mL Parr reactor was charged with $Zn_{4.6}Zr_{0.4}Cl_{4.8}(BTDD)_3$ (4.9 mg, 3.77 µmol), MMAO-12 (0.45 mL, 7 w % aluminum in toluene, d=0.895, 1.04 mmol), toluene (4.5 mL), and a stirbar. The reactor was tightly sealed, transferred out of the glovebox, and pressurized with ethylene (40 bar) with high speed stirring. The pressure was maintained for one hour, after which the reaction was carefully depressurized and quenched with methanol. The reaction was transferred to a round bottom flask and concentrated in vacuo. The resulting white solid was then treated with 100 mL of 9:1 methanol: HCl (conc.), and then sonicated for 30 minutes. The product was rinsed with methanol and dried in vacuo, affording 143 mg (5.11 mmol, 3400 turnovers per Zr) of fine, powdery polyethylene. The product was analyzed by IR and DSC. An average of three DSC analyses provided second scan heat of fusion of 180 J/g (61% crystallinity) and melting peak of 134.7° C.

Example 4

This example describes the ethylene/1-hexene copolymerization with Zr(IV)-MFU-4l. In a nitrogen glovebox, a 50 mL Parr reactor equipped with a ball valve and syringe septum assembly was charged with $Zn_{4.6}Zr_{0.4}Cl_{4.8}(BTDD)_3$ (5.5 mg, 4.23 µmol), MMAO-12 (0.5 mL, 7 w % aluminum in toluene, d=0.895, 1.16 mmol), toluene (3.5 mL), and a stirbar. The reactor was tightly sealed, and transferred out of the glovebox. The reaction was then charged with dry, degassed 1-hexene (1.0 mL) by syringe through the ball valve septum assembly, and then immediately pressurized with ethylene (40 bar). The pressure was maintained for ten hours with high speed stirring, after which the reaction was carefully depressurized and quenched with methanol. The reaction was transferred to a round bottom flask and concentrated in vacuo. The resulting white solid was then treated with 100 mL of 9:1 methanol:HCl (conc.), and then sonicated for 30 minutes. The product was rinsed with methanol and dried in vacuo, affording 200 mg (7.15 mmol, 4300 turnovers per Zr) of fine, powdery polyethylene. The product was analyzed by IR and DSC. An average of three DSC analyses provided second scan heat of fusion of 169.1 J/g (58% crystallinity) and melting peak of 134.1° C.

Example 5

Figure 5:
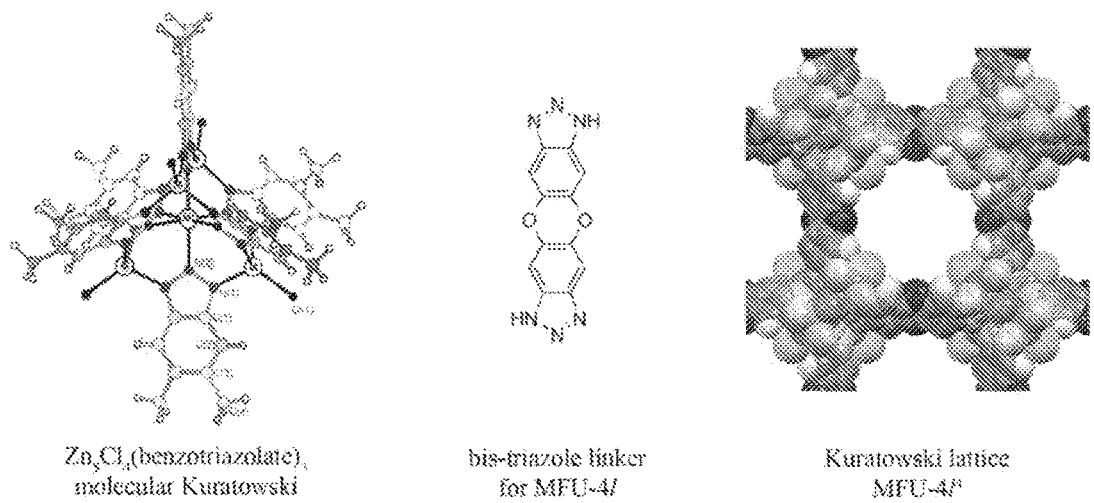
FIG. 5 depicts non-limiting examples of Kuratow ski clusters and related ligands, according to some non-limiting embodiments.

This example describes some additional experimental results obtained for olefin polymerization using the MOFs described herein. In this example, Kuratowski clusters, complexes that are typically composed of a triazolate organic ligand and a divalent metal (FIG. 5), are utilized (e.g., see Biswas, S.; Tonigold, M.; Volkmer, D. Z. Anorg. Allg. Chem. 2008, 634, 2532. Biswas, S.; Tonigold, M.; Speldrich, M.; Kögerler, P.; Weil, M.; Volkmer, D. Inorg. Chem. 2010, 49, 7424), for example, MFU-4 (e.g., see Biswas, S.; Grzywa, M.; Nayek, H. P.; Dehen, S.; Senkovswka, I.; Kaskel, S.; Volkmer, D. Dalton Trans. 2009, 6487. Teufel, J.; Oh, H.; Hirscher, M.; Wahiduzzaman, M.; Zheckov, L.; Kuc, A.; Heine, T.; Denysenko, D.; Volkmer, D. Adv. Mater. 2013, 25, 635) and MFU-4l (e.g., see Denysenko, D.; Grzywa, M.; Tonigold, M.; Streppel, B.; Krkljus, I. Hirscher, M.; Mugnaioli, E.; Kolb, U.; Hanss, J.; Volkmer, D. Chem. Eur. J. 2011, 17, 1837). In particular, the preparation of early transition metal analogues of these complexes by cation exchange of MFU-4l with $Sc^{3+}$, $Ti^{3+}$, $Ti^{4+}$, $V^{2+}$, $Cr^{2+}$, and $Cr^{3+}$ are described. Performed under mild conditions, this process preserves the framework structure of this material, and thus offers both a predictable strategy for controlling the coordination chemistry and a thermally and chemically resilient solid support for catalysis. Furthermore, desolvation of these materials provides access to coordinative unsaturation, activating this system for reactivity with weakly binding alkene substrates. When treated with organometallic activators such as methylaluminoxane, these materials are highly active catalysts for the polymerization of ethylene under mild conditions.

Experimental Details and Results:

Cr(II)-MFU-4l: Under air-free and anhydrous conditions, the material MFU-4l (e.g., see Boudjouk, P.; So, J.-H.; Ackerman, M. N.; Hawley, S. E.; Turk, B. E. Solvated and Unsolvated Anhydrous Metal Chlorides from Metal Chloride Hydrates. In Inorganic Synthesis. John Wiley & Sons, Inc: Hoboken, N.J., USA, 1992; Vol. 29; p 108) (300 mg, 0.24 mmol) was soaked in a solution of $CrCl_2$ (1.46 g, 12 mmol, 50 equivalents) and DMF (100 mL) for seven days. The solid was obtained by filtration, and then soaked in fresh DMF (200 mL) for four days, refreshing the supernatant every day. The material was then soaked in THF at 60° C. for four days, refreshing the supernatant every day. The resulting pale green powder was then dried under vacuum at 185° C. for 12 hours. PXRD analysis shows that the product has a crystalline structure directly analogous to the starting material. IR analysis shows that residual solvent has largely been removed. Gas adsorption analysis (nitrogen, 77K) provides a BET surface area of 2313.36 $m^2/g$ (±15.6), similar to that reported for MFU-4l (2750 $m^2/g$, argon, 77K). A digest of this material was prepared for ICP-AES analysis by soaking in $HNO_3$ overnight, followed by filtration. This analysis indicated a ratio of 1:1 Zn:Cr. Exposure of the material to air leads to an immediate color transition from pale green to brown, followed by a slow color change to olive green. Air sensitivity is consistent with a Cr(II) oxidation state.

Cr(III)-MFU-4l: Under air-free and anhydrous conditions, the material MFU-4l (500 mg, 0.396 mmol) was soaked in a solution of $CrCl_2$ (10 mg, 0.08 mmol, 0.2 equivalents), $CrCl_3 \cdot 3THF^1$ (3.0 g, 20 equivalents) and DMF (150 mL) for seven days. The solid was obtained by filtration, rinsing with DMF (200 mL) and methanol (200 mL) without exclusion of air or moisture. The resulting green powder was then soaked in methanol (20 mL) at 60° C. five times for 12-24 hours each, removing the supernatant each time by centrifugation. The material was then soaked in dichloromethane (20 mL, ambient temperature) twice for 12 hours each, and then dried at 150° C. for 12 hours, providing a bright yellow solid. PXRD analysis shows that the product has a crystalline structure directly analogous to the starting material. IR analysis shows that residual solvent has largely been removed. Gas adsorption analysis (nitrogen, 77K) provides a BET surface area of 2549.52 $m^2/g$ (±12.7), similar to that reported for MFU-4l (2750 $m^2/g$, argon, 77K). A digest of this material was prepared for ICP-AES analysis by soaking in $HNO_3$ overnight, followed by filtration. This analysis indicated a ratio of 1:4 Zn:Cr.

Ti(III)-MFU-4l. Under air-free and anhydrous conditions, the material MFU-4l (500 mg, 0.396 mmol) was soaked in a solution of $TiCl_3 \cdot 3THF$ (4.37 g, 19.8 mmol, 50 equivalents) and acetonitrile (200 mL) for seven days. The solid was obtained by filtration, rinsing with fresh, dry, degassed acetonitrile. The material was soaked in acetonitrile for three days, refreshing the solvent every day. Under high vacuum, the material was dried at 180° C. for 12 hours. PXRD analysis shows that the product has a crystalline structure directly analogous to the starting material. IR analysis shows that residual solvent has largely been removed. The product was analyzed by ICP-MS at Robertson Microlit analytical laboratories. This analysis indicated a ratio of 1.59:3.41 Ti:Zn.

Ethylene Polymerization. Example with Cr(III)-MFU-4l. Under nitrogen atmosphere, a solution of methyl aluminoxane (1.25 mL, 10% w/w solution in toluene, 1.89 mmol, 509 equivalents) was added to a suspension of Cr(III)-MFU-4l (5.0 mg, 0.0037 μmol, 1 equivalent) and toluene (4 mL) in a 25 mL Parr reactor equipped with a stirbar. The reactor was sealed and then pressurized with ethylene (40 bar). After one hour, the pressure was carefully released. At this point the reaction had congealed into a waxy yellow solid. This material was dried in vacuo to obtain the desired polyethylene product as a white solid. The solid was then treated with a 10:1 solution of methanol and concentrated HCl and then sonicated for 20 minutes. (1.42 g, 50.6 mmol, 3,400 turnovers per equivalent of Cr). The product was then analyzed by IR in attenuated total reflectance (ATR) mode using a Bruker Tensor 37 with a germanium ATR stage. The product's heat of fusion and melting point were evaluated by differential scanning calorimetry using a TA Instruments DSC Q100 using a standard pan. See Table 4 for results.

TABLE 4

| MOF | Ethylene Pressure | Polymer Crystallinity* | Polymer Melting Point* | Turnover |
|---|---|---|---|---|
| Cr(III)-MFU-4l | 40 bar | 66% | 133.2° C. | 3,420 |
| Cr(III)-MFU-4l | 10 bar | 55% | 133.2° C. | 1000 |
| Cr(III)-MFU-4l | 1 bar | 55% | 133.8° C. | 110 |
| Cr(II)-MFU-4l | 40 bar | 60% | 134.4° C. | 4,064 |
| Ti(III)-MFU-4l | 40 bar | 58% | 135.4° C. | 15,000 |
| Ti(III)-MFU-4l | 9 bar | 56% | 134.8° C. | 2,850 |

TABLE 4-continued

| MOF | Ethylene Pressure | Polymer Crystallinity* | Polymer Melting Point* | Turnover |
|---|---|---|---|---|
| Ti(III)-MFU-4l | 5 bar | 54% | 134.6° C. | 1,750 |
| Ti(IV)-MFU-4l | 40 bar | 50% | 124.5° C. | 5,306 |

*Evaluated by differential scanning calorimetry, using a scan rate of 10° C./minute from 0° C. to 200° C., followed by cooling at the same rate. Data above are from the second heating cycle. Percent crystallinity is calculated based on a theoretical heat of fusion of 293 J/g for crystalling polyethylene (e.g., see TA 123 "Determination of Polymer Crystallinity by DSC" TA Instruments, New Castle, DE.)

Molecular Weight Control with Hydrogen. Example with Ti(111)-MFU-4l. Under nitrogen atmosphere, a solution of methyl aluminoxane (1.00 mL, 10% w/w solution in toluene, 1.5 mmol, 384 equivalents) was added to a suspension of Ti(III)-MFU-4l (5.0 mg, 0.0037 µmol, 1 equivalent) and toluene (4 mL) in a 25 mL Parr reactor equipped with a stirbar. The reactor was sealed and then pressurized with hydrogen (10 bar). The port to hydrogen was then closed and then the reactor was pressurized to a total of 20 bar using ethylene, using a back flow regulator to maintain the partial pressure of hydrogen in the reactor (assumed to give a partial pressure of 10 bar for ethylene). After one hour, the pressure was carefully released. The contents of the reaction were transferred to a round bottom flask using methanol to quench the reaction and aid the transfer, and then concentrated in vacuo. The resulting white solid was treated with 10:1 methanol:HCl and then sonicated for 30 minutes. The product was obtained by filtration, rinsing with methanol and then drying in vacuo for several hours (281 mg, 10 mmol, 1620 turnovers per Ti). The product was analyzed as above. See Table 5 for results.

TABLE 5

| MOF | Ethylene Pressure | Hydrogen Pressure | Polymer Crystal-linity* | Melting Point* | Turnover |
|---|---|---|---|---|---|
| Cr(III)-MFU-4l | 10 bar | 0 | 55% | 133.2° C. | 1000 |
| Cr(III)-MFU-4l | 8.6 bar | 8.6 bar | 63% | 130.1° C. | 85 |
| Ti(III)-MFU-4l | 9 bar | 0 bar | 56% | 134.8° C. | 2,850 |
| Ti(III)-MFU-4l | 10 bar | 10 bar | 77% | 134.7° C. | 1,620 |
| Ti(III)-MFU-4l | 13 bar | 2 bar | 67% | 137.8° C. | 3,376 |

*Evaluated by differential scanning calorimetry, using a scan rate of 10° C./minute from 0° C. to 200° C., followed by cooling at the same rate. Data above are from the second heating cycle. Percent crystallinity is calculated based on a theoretical heat of fusion of 293 J/g for crystalling polyethylene.

Ethylene/Propylene Copolymerization. Example with Ti(III)-MFU-4l. Under nitrogen atmosphere, a solution of methyl aluminoxane (0.70 mL, 10% w/w solution in toluene, 1.05 mmol, 269 equivalents) was added to a suspension of Ti(III)-MFU-4l (5.0 mg, 0.0037 µmol, 1 equivalent) and toluene (4 mL) in a 50 mL Parr reactor equipped with a stirbar. The reactor was sealed and then pressurized with propylene (9 bar). The port to hydrogen was then closed and then the reactor was pressurized to a total of 19 bar using ethylene, using a back flow regulator to maintain the partial pressure of propylene in the reactor (assumed to give a partial pressure of 10 bar for ethylene). After one hour, the pressure was carefully released. The contents of the reaction were transferred to a round bottom flask, using methanol to quench the reaction and aid the transfer, and then concentrated in vacuo. The resulting white solid was treated with 10:1 methanol:HCl and then sonicated for 30 minutes. The product was obtained by filtration, rinsing with methanol and then drying in vacuo for several hours (750 mg, 27 mmol, 3480 turnovers per Ti). The product was analyzed as above. In addition, the product was analyzed by solid state $^{13}$C-NMR (125 MHz, magic angle spinning, 3 seconds relaxation delay, 10 ms FID acquisition time, $^{13}$C pulse width 7 ms, 20,352 scans, 17 hours). See Table 6 for results.

TABLE 6

| MOF | Ethylene Pressure | Propylene Pressure | Polymer Crystallinity[a] | Melting Point[a] | Turnover per hour | Incorporation[b] |
|---|---|---|---|---|---|---|
| Cr(III)-MFU-4l | 10 bar | 0 | 55% | 133.2° C. | 1,000 | |
| Cr(III)-MFU-4l | 10 bar | 10 bar | 54% | 112.8° C. | 95 | |
| Ti(III)-MFU-4l | 9 bar | 0 bar | 56% | 134.8° C. | 2,850 | 0% |
| Ti(III)-MFU-4l | 10 bar | 9 bar | 37% | 124.5° C. | 520 | 27% |
| Ti(IV)-MFU-4l | 40 bar | 0 bar | 50% | 127.4° C. | 5,306 | |
| Ti(IV)-MFU-4l | 10 bar | 9 bar | 30% | 112.8° C. | 117 | 15% |

[a]Evaluated by differential scanning calorimetry, using a scan rate of 10° C./minute from 0° C. to 200° C., followed by cooling at the same rate. Data above are from the second heating cycle. Percent crystallinity is calculated based on a theoretical heat of fusion of 293 J/g for crystalling polyethylene.
[b]Evaluated by $^{13}$C NMR.

Discussion

The MOFs described herein offer a soft, meridional coordination environment directly analogous to these molecular cyclopentadienyl and tris-pyrazolylborate polymerization catalysts. The incorporation of this unit into a metal organic framework supports these catalysts in a porous, high surface area solid ideal for large scale industrial catalysis. Without wishing to be bound by theory, the response to hydrogen suggests single site behavior in this system and offers an important mode of molecular weight control. The copolymerization activity offers molecular level control for the production of linear low density polyethylene and ethylene/propylene elastomers using heterogeneous catalysis. Moreover, the inherent site isolation offers opportunities for tandem catalysis, for example tandem oligomerization and copolymerization of ethylene to produce linear low density polyethylene in one pot from ethylene.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for forming a polyolefin from an olefin, the method comprising:
    exposing the olefin to a metal organic framework (MOF) catalyst to produce the polyolefin,
    wherein the MOF catalyst comprises a plurality of metal ions, each metal ion coordinated with at least one ligand, and
    wherein the at least one ligand comprises at least two N-heterocyclic aromatic groups arranged about an organic core.

2. The method of claim 1, wherein the N-heterocyclic aromatic groups are selected from the group consisting of imidazolate, triazolate, and tetrazolate.

3. The method of claim 1, wherein the olefin is ethylene.

4. The method of claim 1, wherein the olefin comprises a combination of ethylene and propylene.

5. The method of claim 1, wherein the MOF comprises a first type of metal ion and a second type of metal ion.

6. The method of claim 5, wherein the first type of metal ion is selected from the group consisting of $Sc^{3+}$, $Ti^{3+}$, $Ti^{4+}$, $V^{2+}$, $Cr^{2+}$, and $Cr^{3+}$.

7. The method of claim 5 wherein the first type of metal ion is $Cr^{2+}$ or $Cr^{3+}$.

8. The method of claim 5 wherein the second type of metal ion is $Zn^{+2}$.

9. The method of claim 1, wherein the polyolefin is liner low-density polyethylene.

10. The method of claim 1, wherein each ligand comprises at least two N-heterocyclic aromatic groups arranged about an organic core, wherein the N-heterocyclic aromatic groups are selected from the group consisting of pyrazolate, pyridinate, imidazolate, triazolate, and tetrazolate.

11. The method of claim 1, wherein an additive is present during the exposing step.

12. The method of claim 11, wherein the additive is selected from the group consisting of an aluminoxane, methylaluminoxane, ethylaluminum dichloride, diethylaluminum chloride, triethylaluminum, an alkyl magnesium halide an alkyllithium, and trimethylaluminum.

13. The method of claim 11, wherein the additive is methylaluminoxane.

14. The method of claim 1, wherein the N-heterocyclic aromatic group is triazolate.

15. The method of claim 1, wherein the MOF comprises at least two ligands comprising triazolate.

16. The method of claim 1, wherein the exposing step is conducted in the presence of hydrogen.

17. A metal organic framework (MOF), comprising:
    a plurality of metal ions, each coordinated with at least one ligand,
    wherein the plurality of metal ions comprises at least two types of metal selected from the group consisting of $Zn^{2+}$, $Cr^{2+}$, and $Cr^{3+}$, tetravalent metals, trivalent metals, and $Zn^{+4}$, and wherein the at least one ligand comprises the structure:

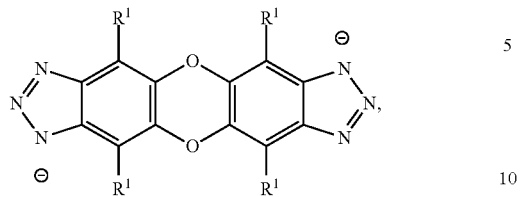

wherein each $R^1$ is the same or different and is selected from the group consisting of hydrogen, -alkyl, —$NO_2$, —R', —F, —Cl, —Br, —I, —CN, —NC, —$SO_3R'$, —$SO_3H$, —OR', —OH, —SR', —SH, —$PO_3R'$, —$PO_3H$, —$CF_3$, —$NR'_2$, —NHR', and —$NH_2$, and each R' is the same or different and is optionally substituted alkyl or optionally substituted aryl.

18. The MOF of claim 17, wherein each $R^1$ is hydrogen.

19. The MOF of claim 17, wherein the MOF is prepared via metal exchange of a substantially similar MOF comprising only $Zn^{+2}$.

20. The MOF of claim 17, wherein the plurality of metal ions comprises at least two types of metal selected from the group consisting of $Zn^{2+}$, $Cr^{2+}$, and $Cr^3$.

21. The method of claim 1, wherein the MOF is as claimed in any one of claims 17-20.

* * * * *